United States Patent
Rashid et al.

(10) Patent No.: US 11,638,135 B2
(45) Date of Patent: Apr. 25, 2023

(54) CORE NETWORK DESIGN FOR MISSION-CRITICAL IOT

(71) Applicant: Apple Inc., Cupertino, CA (US)

(72) Inventors: Mohammad Mamunur Rashid, Hillsboro, OR (US); S. M. Iftekharul Alam, Hillsboro, OR (US); Ching-Yu Liao, Portland, OR (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 16/305,380

(22) PCT Filed: Jun. 28, 2016

(86) PCT No.: PCT/US2016/039761
§ 371 (c)(1),
(2) Date: Nov. 28, 2018

(87) PCT Pub. No.: WO2018/004529
PCT Pub. Date: Apr. 1, 2018

(65) Prior Publication Data
US 2020/0329354 A1    Oct. 15, 2020

(51) Int. Cl.
*H04W 4/70* (2018.01)
*H04W 76/11* (2018.01)
*H04W 40/02* (2009.01)

(52) U.S. Cl.
CPC .............. *H04W 4/70* (2018.02); *H04W 40/02* (2013.01); *H04W 76/11* (2018.02)

(58) Field of Classification Search
CPC ............... H04L 45/121; H04L 61/2007; H04L 67/1002; H04L 67/16; H04W 40/02; H04W 4/70; H04W 76/11
See application file for complete search history.

(56) References Cited

U.S. PATENT DOCUMENTS

| | | | |
|---|---|---|---|
| 2010/0135199 A1* | 6/2010 | Nordin | H04L 67/04 370/328 |
| 2014/0019639 A1* | 1/2014 | Ueno | H04L 61/103 709/238 |

(Continued)

FOREIGN PATENT DOCUMENTS

EP    2693696    2/2014

OTHER PUBLICATIONS

Trivisonno et al., "SDN-based 5G mobile networks: architecture, functions, procedures and backward compatibility", 2014, Huawei European Research Institute. (Year: 2014).*

(Continued)

*Primary Examiner* — Schquita D Goodwin
*Assistant Examiner* — Jonathan A Sparks
(74) *Attorney, Agent, or Firm* — Sterne, Kessler, Goldstein & Fox P.L.L.C.

(57) ABSTRACT

Described is a Logical Network Controller (LNC) operable to communicate with a User Equipment (UE) on a wireless network. The LNC may be operable to process connection request transmissions from the UE requesting a connection with an application service, such as a Mission-Critical Internet-of-Things (MC-IoT) service, to determine a Connection-specific Application Server Instance (CASI) for the application service, and to generate connection response transmissions for the UE carrying a connection-specific source IP address corresponding to the UE and a connection-specific destination IP address corresponding to the CASI. The UE may be operable to generate connection request transmissions for the LNC requesting a connection with an application service, to process connection response transmissions from the LNC carrying a connection-specific destination IP address corresponding to a CASI for the application service, and to generate connection-specific transmissions for the CASI, the connection-specific transmissions carrying the connection-specific destination IP address.

18 Claims, 17 Drawing Sheets

(56) References Cited

U.S. PATENT DOCUMENTS

| | | | | |
|---|---|---|---|---|
| 2016/0156513 | A1* | 6/2016 | Zhang | H04L 67/10 709/220 |
| 2016/0165663 | A1* | 6/2016 | Shanmugam | H04W 8/10 370/338 |
| 2016/0219420 | A1* | 7/2016 | Sah | H04W 28/0215 |
| 2016/0234730 | A1* | 8/2016 | John | H04W 36/0033 |
| 2016/0353465 | A1* | 12/2016 | Vrzic | H04W 28/0247 |
| 2017/0006141 | A1* | 1/2017 | Bhadra | H04W 84/18 |
| 2017/0164135 | A1* | 6/2017 | Kodaypak | H04W 4/70 |
| 2017/0164349 | A1* | 6/2017 | Zhu | H04W 28/0247 |
| 2017/0317894 | A1* | 11/2017 | Dao | H04W 28/24 |
| 2018/0206159 | A1* | 7/2018 | Vrzic | H04W 36/32 |
| 2018/0359688 | A1* | 12/2018 | An | H04W 74/006 |

OTHER PUBLICATIONS

Zhang et al., "Mission Critical IoT Communication in 5G", 2015, Institute for Computer Sciences, Social Informatics and Telecommunications Engineering 2015. (Year: 2015).*

Ratasuk et a., "Recent Advancements in M2M Communications in 4G Networks and Evolution Towards 5G", Nokia Technologies. (Year: 2015).*

International Search Report and Written Opinion for International Patent Application No. PCT/US16/39761, dated Mar. 8, 2017.

A.1.1. PoC Team; "NFV ISG PoC Proposal virtual EPC with SDN Function in Mobile Backhaul Networks", ETSI Draft; pp. 1-8; France; Nov. 17, 2014.

Camarillo, G. et al., "Session Control in the IMS", The 3G IP Multimedia Subsystem (IMS): Merging the Internet and the Cellular Worlds; pp. 91-178; Jul. 1, 2005.

Cvijetic, N. et al., "SDN-controlled topology-reconfigurable optical mobile fronthaul architecture for bidirectional CoMP and low latency intercell D2D in the 5G mobile era", Optics Express; vol. 22, No. 17; Aug. 25, 2014.

QUALCOMM,"Evaluation of the LTE/SAE User Plane Latency", 3GPP TSG RAN WG2 Meeting #63; R2-061311; May 8-12, 2006; Shanghai, China.

SA WG2,"TR 23.707: Architecture Enhancements for Dedicated Core Networks; Stage 2 (DECOR)", 3GPP TSG SA Meeting #66; Maui, Hawaii, U.S.A, Dec. 10-12, 2014.

International Preliminary Report on Patentability for International Patent Application No. PCT/US16/39761, dated Jan. 10, 2019.

* cited by examiner

CORE NETWORK DESIGN FOR MISSION-CRITICAL IOT

CLAIM OF PRIORITY

This Application is a National Stage Entry of, and claims priority to, PCT Application No. PCT/US16/39761, filed on Jun. 28, 2016 and titled "CORE NETWORK DESIGN FOR MISSION-CRITICAL IOT", which is incorporated by reference in its entirety for all purposes.

BACKGROUND

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation wireless/5th Generation mobile networks (5G) system. Next-generation wireless cellular communication systems may provide support for various Internet-of-Things (IoT) devices. Meanwhile, some Mission-Critical (MC) applications may require communication channels having ultra-low latencies, high reliability, or both.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
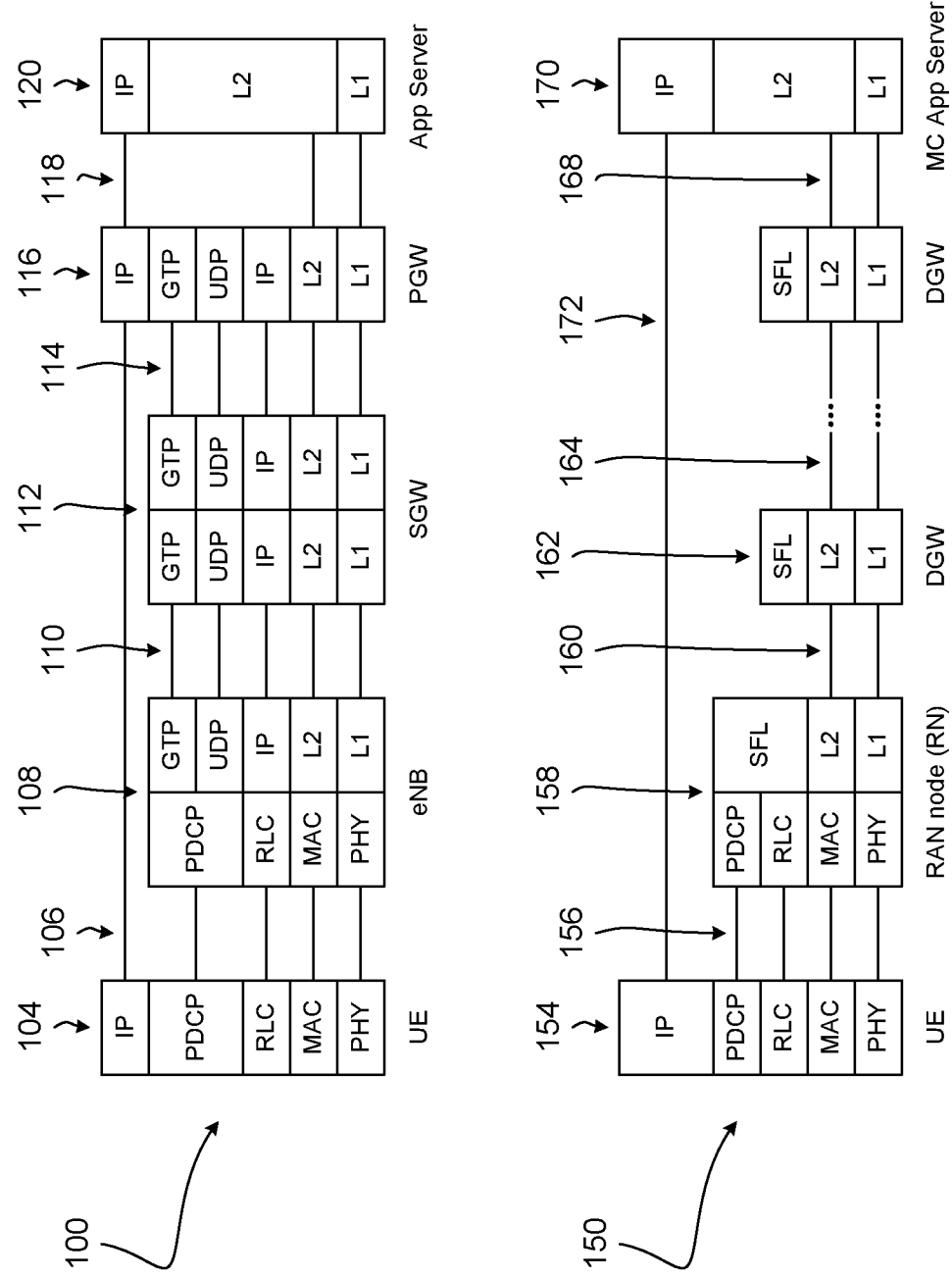
FIG. 1 illustrates wireless communication system protocol stacks, in accordance with some embodiments of the disclosure.

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation wireless/5th Generation mobile networks (5G) system. Next-generation wireless cellular communication systems may provide support for various Internet-of-Things (IoT) devices (which may include Narrowband IoT (NB-IoT) devices or Cellular IoT (C-IoT) devices).

Meanwhile, some Mission-Critical (MC) applications may be based upon wireless communication systems having ultra-low latencies (e.g., sub-millisecond latencies), extremely high reliability (e.g., "six nines" or 99.9999% reliability), or both. Various Mission-Critical Internet-of-Things (MC-IoT) or other emerging applications, like tactile internet applications or real-time end-to-end communication (e.g., remote robot and/or drone control), may be based upon wireless communication with ultra-low latencies and/or extremely high reliability. However, current Evolved Packet Core (EPC) architectures do not adequately provide for ultra-low latencies and/or extremely high reliability. In some instances, for example, latencies due to Core Network (CN) delays may range in milliseconds, even without accounting for propagation delays. Improved latency and reliability may accordingly be advantageous to support various applications such as MC-IoT applications.

Legacy EPC architectures may encompass some lower-latency and/or higher-reliability provisioning. For example, legacy EPC architectures may include a service-layer approach such as Mobile Edge Computing (MEC), which may bring applications and services together at Radio Access Network (RAN) nodes and selectively offload traffic to co-located application servers. However, such approaches may be inadequate for MC-IoT support. Traffic travelling to a destination far from the RAN may still have to traverse a CN that may introduce at least a few milliseconds due to tunneling and other protocol stack delays; caching of content at edges (e.g., at RAN nodes) may not be suitable for real-time end-to-end communication; and for mobile UEs transitioning frequently among RAN notes, session continuity may be extremely hard to provide and may introduce significant latencies during handover.

Alternatively, legacy EPC architectures may include a management layer approach such as network slicing, which may virtually partition CN resources on the basis of types of traffic, user type, or services. With network function virtualization, network slicing may involve deployment of virtualized Serving Gateways (SGWs) and Packet Data Network (PDN) Gateways (PGWs) across a network. The SGWS and PGWs (which may be fixed nodes) may reduce latency. However, these approaches may also be unsuitable for MC-IoT support. Network level protocols (e.g., EPC protocols) may incorporate tunneling that may in turn introduce latencies between virtualized network functions, and may establish fixed (e.g., inflexible) paths between a UE and an application server. In addition, virtualized functions may implement the whole protocol stack relevant to the EPC elements being virtualized, which may make such approaches costly to deploy, may introduce processing latencies for packets, and may make maintenance activities and upgrading efforts costly and/or time-consuming (especially where many instances of these virtualized functions may need to be deployed across a network in order to achieve latency targets).

Discussed herein are CNs having ultra-low latency (e.g., sub-millisecond latency, excluding propagation delays) and extremely high reliability to support MC-IoT applications, along with various elements of the CNs. In some embodiments, the CNs disclosed herein may incorporate elements having a simple data-plane protocol stack, which may merely support data-transport functions, and may advantageously obviate a need for heavyweight tunneling. For some embodiments, the disclosed CNs may support flexible and dynamic connectivity between a UE and an application server, such as an MC-IoT application server, over various flows. In some embodiments, the disclosed CNs may establish simultaneous data paths between a UE and different server instances of a service, such as an MC-IoT service. The server instances may vary due to UE mobility, changing network characteristics (e.g., load, latency, and/or reliability), and/or different Quality-of-Service (QoS) targets. The disclosed CNs may also establish redundant data-paths for the same flow. The flexible and dynamic connectivity may thereby advantageously provide consistently ultra-low latencies and extremely high reliabilities.

The disclosure herein may address underlying CN architectures and protocols to remove obstacles to providing ultra-low latency and extremely high reliability. For the disclosed CNs, a network level approach may distribute very low-cost data-plane elements across the network. Maintenance and updates or changes to network functions and protocols may not need to extend to those very low-cost data-plane elements, which may reduce maintenance and/or operating costs.

The CNs may incorporate data planes optimized for ultra-low latency through Software-Defined Networking (SDN). Some legacy EPC deployments may be SDN-based (such as proprietary solutions to convert the SGW and PGW protocol stack into separate data and control planes). However, in contrast with the CNs discussed herein, a standards-compliant SDN-based legacy EPC deployment may need to implement tunneling, fixed network paths for PDN connections without any support for multiple data paths for a single flow, and other aspects of legacy EPC protocol that contribute to pushing latencies past one millisecond.

For some embodiments disclosed herein, the CNs may not support non-3GPP access and/or legacy LTE access. In some embodiments, the CNs may interface with devices supporting legacy EPC architectures. However, for some embodiments, legacy traffic steering methods may be applied to steer MC traffic to the CNs discussed herein. Similarly, in some embodiments, the CNs may be orthogonal to network slicing, and a slice dedicated for MC-IoT traffic may implement elements of the CN architecture and design concepts disclosed herein.

Legacy EPC architecture may provide for features such as bearers (e.g., fixed paths between a UE and an application server) and associated tunneling models. However, these features may result in a CN that lacks the flexibility and dynamicity that would be conducive to MC-IoT implementations requiring ultra-low latencies and extreme reliability.

First, legacy EPC architecture may provide for fixed network paths for traffic flowing between application servers and UEs, and the traffic may belong to different applications with differing latency and reliability targets. Dedicated bearers may provide for differential QoS treatment of different traffic flows. However, the CN paths themselves may not be adequate to meet MC-IoT latency and reliability targets. Dedicated bearers may still be associated with the same network paths as those of default bearers, and dynamic network changes (e.g., network congestion and/or node failures) may impact dedicated bearers similarly.

Secondly, with UE mobility, handovers may result in a change of SGW, but a network path between the PGW and a new SGW may still depend upon an already-established General Packet Radio Service (GPRS) Tunneling Protocol (GTP) tunnel between the PGW and the new SGW. As a result, fine-grained dynamic updates of network paths to maintain ultra-low latencies and extreme reliability may not be possible. As a new flow is introduced in a session, an application server most suited for the new flow may be different, due to QoS requirements of the new flow, loads and/or latencies of the servers, and/or the relative locations of the UE and the servers.

Some CN embodiments disclosed herein may utilize one or more values of a five-tuple of values to distinguish traffic flows from each other. The five-tuple of values may comprise a source Internet Protocol (IP) address, a destination IP address, a source port number, a destination port number, and an IP protocol (e.g., Transmission Control Protocol (TCP) or User Datagram Protocol (UDP)). A Logical Network Controller (LNC) element of a CN may use the five-tuple of values to control an entire data path without relying on tunneling among specialized network nodes. An LNC may have control authority over multiple IP subnets in an CN, which may facilitate the offering of the best possible data path to an MC-IoT flow, in a dynamic manner, in order to reach sub-millisecond latency and extreme reliability.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Various embodiments of LNCs and/or UEs discussed below may process one or more transmissions of various types. Some processing of a transmission may comprise demodulating, decoding, detecting, parsing, and/or otherwise handling a transmission that has been received. In some embodiments, an LNC or UE processing a transmission may determine or recognize the transmission's type and/or a condition associated with the transmission. For some embodiments, an LNC or UE processing a transmission may act in accordance with the transmission's type, and/or may act conditionally based upon the transmission's type. An LNC or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an LNC or a UE through one or more layers of a protocol stack.

Various embodiments of LNCs and/or UEs discussed below may also generate one or more transmissions of various types. Some generating of a transmission may comprise modulating, encoding, formatting, assembling, and/or otherwise handling a transmission that is to be transmitted. In some embodiments, an LNC or UE generating a transmission may establish the transmission's type and/or a condition associated with the transmission. For some embodiments, an LNC or UE generating a transmission may act in accordance with the transmission's type, and/or may act conditionally based upon the transmission's type. An LNC or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an LNC or a UE through one or more layers of a protocol stack.

In addition, although the applications, services, and servers discussed below may be advantageously employed for MC-IoT purposes, they may also be advantageously employed for other, non-MC-IoT purposes.

FIG. 1 illustrates wireless communication system protocol stacks, in accordance with some embodiments of the disclosure. An end-to-end data plane 100 may be a legacy EPC data plane. End-to-end data plane 100 may comprise a UE 104, an Evolved Node-B (eNB) 108, an SGW 112, a PGW 116, and an application server 120. UE 104 and eNB 108 may be coupled by a UE/eNB interface 106. eNB 108 and SGW 112 may be coupled by an eNB/SGW interface 110. SGW 112 and PGW 116 may be coupled by an SGW/PGW interface 114. PGW 116 and application server 120 may be coupled by a PGW/application-server interface 118.

UE 104 and eNB 108 may comprise protocol stacks including a physical (PHY) layer, a Medium Access Control (MAC) layer, a Radio Link Control (RLC) layer, and/or a Packet Data Convergence Protocol (PDCP) layer, and the protocol stack of UE 104 may also include an Internet Protocol (IP) layer. For eNB/SGW interface 110, eNB 108 and SGW 112 may comprise protocol stacks including an L1 layer (e.g., a PHY layer), an L2 layer (e.g., a MAC layer), an intermediate IP layer, a User Datagram Protocol (UDP)

layer, and/or a GTP layer. For SGW/PGW interface 114, SGW 112 and PGW 116 may comprise protocol stacks including an L1 layer (e.g., a PHY layer), an L2 layer (e.g., a MAC layer), an intermediate IP layer, a UDP layer, and/or a GTP layer, and the protocol stack of PGW 116 may also include an additional IP layer (which may interface with the IP layer of UE 104). For PGW/application-server interface 118, application server 120 may comprise an L1 layer (e.g., a PHY layer), an L2 layer (e.g., a MAC layer), and/or an IP layer.

eNB/SGW interface 110 and SGW/PGW interface 114 may also comprise one or more intermediate IP routers for tunneling, which may introduce intermediate latencies. In addition, SGW 112 and/or PGW 116 may be fixed nodes, and traffic may be required to traverse paths through SGW 112 and/or PGW 116. Packets traversing end-to-end data plane 100 may traverse all the layers of these protocol stacks. The GTP layers, UDP layers, and/or intermediate IP layers of the protocol stacks for eNB/SGW interface 110 and SGW/PGW interface 114 may add multiple milliseconds of delay due to tunneling.

As discussed herein, a data plane in a CN may instead be designed as a collection of Software-Defined Networking (SDN) enabled switches. These switching data-plane elements may be referred to as Data Gateways (DGWs), and may merely serve to transport data according to a switching configuration (which may be supplied by an LNC). DGWs may comprise relatively simple routers, and may have lightweight routing layers. In addition, a network of DGWs may comprise multiple alternative paths between any two DGWs from which a minimum-latency path may be chosen. As a result, the latencies associated with the DGWs may be very small.

For example, an end-to-end data plane 150 may be a data plane for a dedicated CN for supporting MC-IoT applications. End-to-end data plane 150 may comprise a UE 154, a RAN node (RN) 158, one or more DGWs 162, and an MC application server 170. UE 154 and RN 158 may be coupled by a UE/RN interface 156. RN 158 and one of the DGWs 162 may be coupled by an RN/DGW interface 160. Various DGWs may be coupled by DGW/DGW interfaces 164. One of the DGWs 162 and MC application server 170 may be coupled by a DGW/MC application server interface 168.

For UE/RN interface 156, UE 154 and RN 158 may comprise protocol stacks including a PHY layer, a MAC layer, an RLC layer, and a PDCP layer. For RN/DGW interface 160, RN 158 and DGW 162 may comprise protocol stacks including an L1 layer (e.g., a PHY layer), an L2 layer (e.g., a MAC layer), and an SDN Forwarding Layer (SFL) layer. For DGW/DGW interface 164, a DGW 162 may comprise a protocol stack including an L1 layer (e.g., a PHY layer), an L2 layer (e.g., a MAC layer), and an SFL layer. For DGW/MC application server interface 168, a DGW 162 and an MC application server 170 may comprise protocol stacks including an L1 layer (e.g., a PHY layer) and an L2 layer (e.g., a MAC layer). In addition, UE 154 and MC application server 170 may be coupled by a UE/MC application server interface 172, for which the protocol stacks of UE 154 and MC application server 170 may comprise an IP layer.

In comparison with the latencies in end-to-end data plane 100 associated with protocol stacks for eNB/SGW interface 110 and SGW/PGW interface 114, the protocol stacks of DGWs 162 in end-to-end data plane 150 may have ultra-low latencies, which may be between sub-microsecond latencies and latencies of a few microseconds, for example. Relative to protocol stacks of various elements in end-to-end data plane 100, and the heavyweight tunneling that may be necessary to traverse them, the protocol stacks of end-to-end data plane 150 may be far more lightweight and may thereby enable sub-millisecond latencies.

Figure 2:
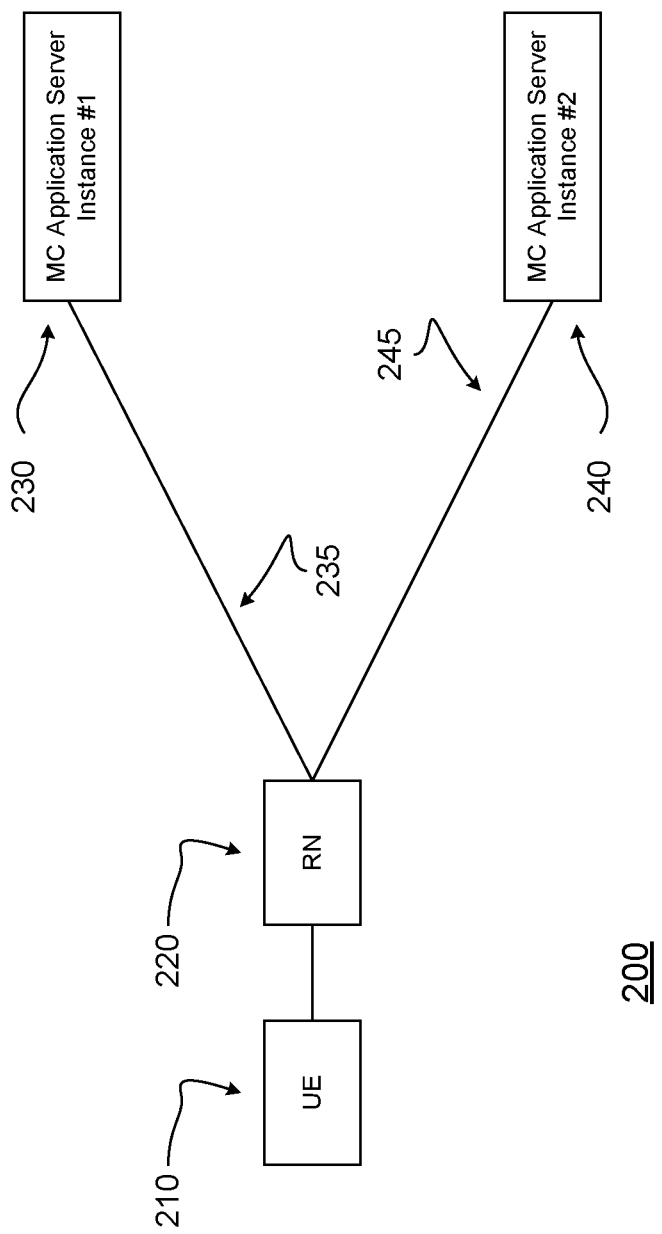
FIG. 2 illustrates a Connection-specific Application Server Instance (CASI) and a Flow-specific Application Server Instance (FASI), and associated data paths, in accordance with some embodiments of the disclosure.

FIG. 2 illustrates a Connection-specific Application Server Instance (CASI) and a Flow-specific Application Server Instance (FASI), and associated data paths, in accordance with some embodiments of the disclosure. A CN portion 200 may comprise a UE 210, an RN 220, a CASI 230, a connection-specific data path 235, a FASI 240, and a flow-specific data path 245.

CASI 230 may be an application server instance chosen to provide a connection to an intended service (e.g., an MC-IoT service). Connection-specific data path 235 may be a data path established for ongoing connectivity between UE 210 and CASI 230. Connection-specific data path 235 may comprise and may pass through one or more DGWs, and an LNC may configure the one or more DGWs to establish the connection-specific data path 235. A UE may be one endpoint of a connection-specific data path, and the other endpoint may be a CASI.

Connection-specific data path 235 may remain active so long as UE 210 is connected with CASI 230. One use of connection-specific data path 235 may be to communicate various application signaling interactions to add and/or remove flows between UE 210 and the service, and to carry packets not belonging to any added flow. Connection-specific data path 235 itself might not be associated with any particular flow.

FASI 240 may be an application server instance to provide a flow for an intended service (e.g., an MC-IoT service), which may be added by CASI 230. Flow-specific data path 245 may be a data path established for ongoing connectivity between UE 210 and FASI 240. Flow-specific data path 245 may comprise and may pass through one or more DGWs, and an LNC may configure the one or more DGWs to establish the flow-specific data path 245. A UE may be one endpoint of a flow-specific data path, and the other endpoint may be a FASI.

Multiple flow-specific data paths may be established between UE 210 and a FASI 240, and each flow may correspond to a different flow. The specific series of DGWs that a particular flow-specific data path comprises may vary between flows, which may facilitate meeting different QoS requirements related to, for example, latency and/or reliability. For example, two flows may have the same QoS requirements, but may be added at different times. The network and traffic dynamics at the time of the addition of the first flow may be different from the network and traffic dynamics at the time of the addition of the second flow. As a result, the optimal data path for the first flow (including the set of DGWs through which the first flow passes) may be correspondingly different from the optimal data path for the second flow (including the set of DGWs through which the second flow passes). The capability of varying flow-specific data paths between different flows may advantageously provide flexibility in meeting QoS requirements.

In a CN having an end-to-end data plane similar to end-to-end data plane 150, a UE may have data communication paths to multiple MC application server instances for the same service. These MC application server instances may be deployed in multiple geographical locations, and may be deployed in different PDNs (e.g., in an MEC deployment scenario). However, a FASI for a given application may be different from the corresponding CASI. Additional FASIs may also be added as needed to support traffic levels. By allowing this flexibility, the CN may select optimal server instances for different flows between the UE and a service, based upon factors such as latency requirements, reliability requirements, and/or load distributions across network elements and different server instances.

A CASI (e.g., CASI 230) may be assigned or may otherwise have an IP address, a port number, and/or an IP protocol corresponding to a connection-specific data path between a UE and the CASI. Similarly, a FASI (e.g., FASI 240) may be assigned or may otherwise have an IP address, a port number, and/or an IP protocol corresponding to a flow-specific data path between a UE and the FASI. In some embodiments, a CASI and a FASI may reside in the same physical server instance. However, in other embodiments, a CASI and a FASI may reside in different physical server instances. Accordingly, a CASI and a FASI may have two different IP addresses. An IP address associated with a CASI may be referred to as a connection-specific server IP address. Similarly, an IP addresses associated with a FASI may be referred to as a flow-specific server IP address.

A UE may be assigned or may otherwise have an IP address, a port number, and/or an IP protocol corresponding to a connection-specific data path between the UE and a CASI. Similarly, the UE may be assigned or may otherwise have one or more IP addresses, one or more port numbers, and/or one or more IP protocols respectively corresponding to flow-specific data paths the UE and one or more FASIs.

DGWs directly coupled to external PDNs and/or interfacing to an outside network (e.g., DGWs directly coupled to MC application servers) may be referred to as "transition DGWs." Transition DGWs on a connection-specific data path between a UE and a CASI may be different from transition DGWs on a flow-specific data path between the UE and a FASI, which may occur if the transition DGWs associated with the connection and the flow (and, e.g., the corresponding CASI and FASI) are part of different IP subnets. Similarly, a UE may have multiple flow-specific IP addresses different from each other depending on the subnets where the transition DGWs associated with the flows (and, e.g., corresponding FASIs) are located.

Transmissions between a UE and a CASI, or between a UE and a FASI, may carry one or more values of five-tuple of values comprising a source IP address, a source port number, a destination IP address, a destination IP number, and/or an IP protocol. Various elements of a CN or an end-to-end data plane (e.g., RNs and/or DGWs) may then use the one or more values of the five-tuple of values to route transmissions along a connection-specific data path established for connectivity between the UE and the CASI, or along a flow-specific data path established for connectivity between the UE and the FASI, in accordance with a data path configuration established by an LNC.

In some embodiments, connection-specific data path 235 and flow-specific data path 245 may sometimes overlap partially or overlap entirely. In some embodiments, for some flows, flow-specific MC application server instance 240 may be the same server as connection-specific MC application server instance 230 instance.

Figure 3:
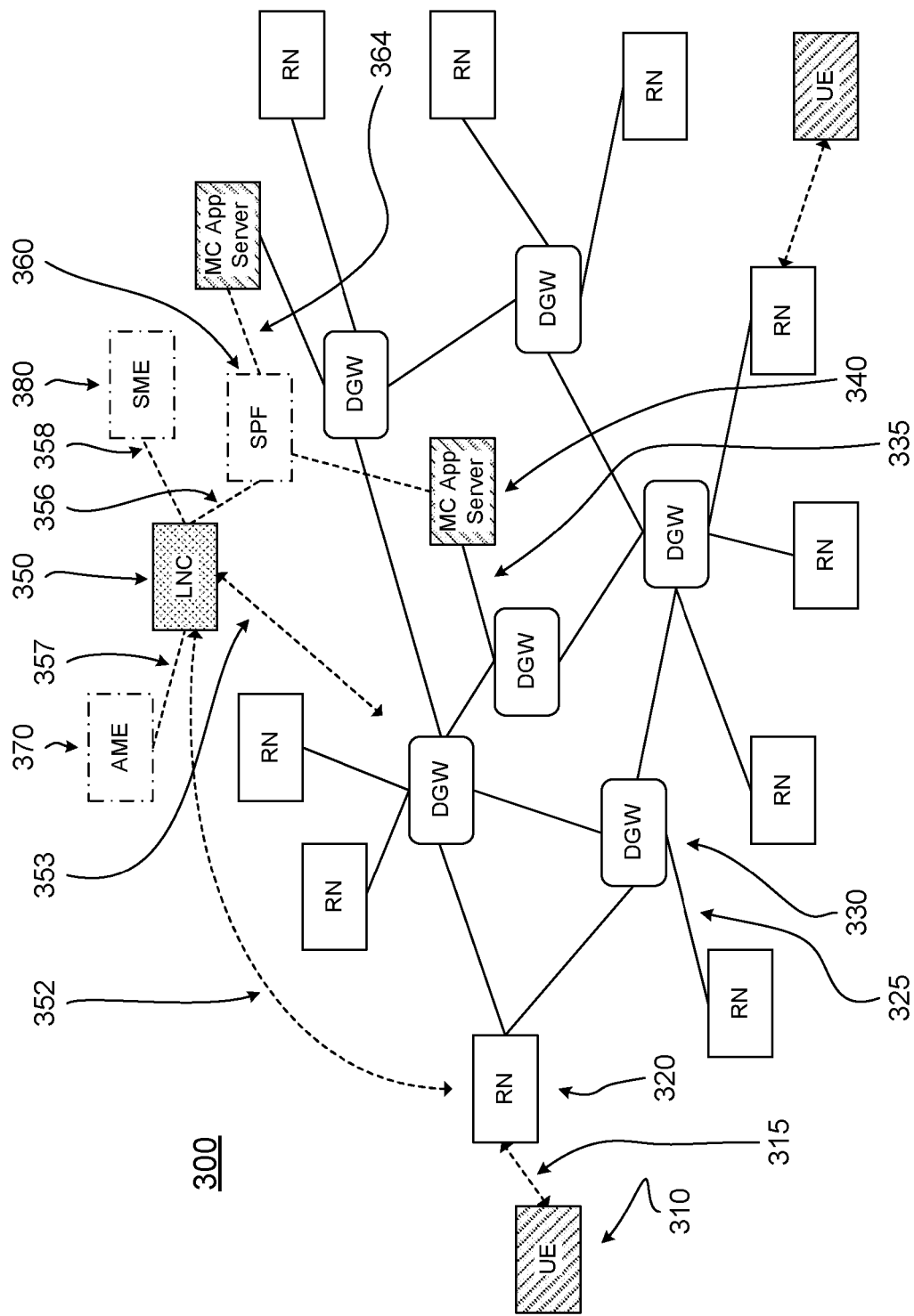
FIG. 3 illustrates an example of a wireless communication system architecture for supporting Mission-Critical (MC) Internet-of-Things (MC-IoT) technology with ultra-low latencies (sub-millisecond) and extremely high reliability, in accordance with some embodiments of the disclosure.

FIG. 3 illustrates an example of a wireless communication system architecture for supporting MC-IoT technology with ultra-low latencies (sub-millisecond) and extremely high reliability, in accordance with some embodiments of the disclosure. A wireless communication system 300 may comprise one or more UEs 310, one or more RNs 320, one or more DGWs 330, and one or more MC application server instances 340. UEs 310 and RNs 320 may be coupled by UE/eNB interfaces 315. RNs 320 and some DGWs 330 may be coupled by RN/DGW interfaces 325. Some DGWs 330 and MC application server instances 340 may be coupled by DGW/MC application server interfaces 335, which may be based on or may otherwise use some form of IP connectivity. In some embodiments, an MC application server instance 340 may reside in a PDN.

In addition, wireless communication system 300 may comprise one or more LNCs 350, one or more Service Portal Functions (SPFs) 360, one or more Authentication Management Entities (AMEs) 370, and/or one or more Subscription Management Entities (SMEs) 380. LNCs 350 and RNs 320 may be coupled by LNC/RN interfaces 352, which may implement control signaling. LNCs 350 and DGWs 330 may be coupled by LNC/DGW interfaces 353, which may be based on or may otherwise employ an SDN Application Programming interface (API) interface (e.g., an OpenFlow interface). LNCs 350 and SPFs 360 may be coupled by LNC/SPF interfaces 356. LNCs 350 and AMEs 370 may be coupled by LNC/AME interfaces 357. LNCs 350 and SMEs 380 may be coupled by LNC/SME interfaces 358. SPFs 360 and MC application server instances 340 may be coupled by SPF/MC application server interfaces 364.

Accordingly, an architecture of wireless communication system 300 may comprise a number of DGWs 330 geographically distributed across an operator's network. DGWs 330 may implement SDN-enabled switches, and may lack control functionality such as tunneling or bearer state management. An operator may establish a geographical distribution of DGWs 330 in order to meet various performance goals, such as latency guarantees, load balancing, and/or edge computing support.

The architecture of wireless communication system 300 may also comprise one or more LNCs 350, which may be logically centralized entities hosting control functionalities in the network. Although LNCs 350 may be logically centralized entities, they may be implemented in a distributed manner, and/or in a hierarchical deployment, to manage traffic of different regions. Some embodiments may be based upon a network slicing deployment, in which an LNC 350 may be a slice specific control plane partition dedicated for MC-IoT applications.

UEs 310 may provide packets bearing one or more values of five-tuple of values comprising a source IP address, a source port number, a destination IP address, a destination IP number, and/or an IP protocol to RNs 320. In turn, RNs 320 may route the packets to DGWs 330. LNCs 350 may initiate new flows between a UE 310 and an MC application server instance 340. LNCs 350 may also configure other elements of wireless communication system 300 (e.g., RNs 320 and/or DGWs 330) to route packets along specific data paths. LNC may effectively establish a set of rules for routing transactions through the network of DGWs based upon one or more values of the five-tuple of values, such that traffic recognized by various CN elements as being from a particular source and/or to a particular destination is routed through specific nodes of a configured data path.

SPFs 360 may assist LNCs 350 in deciding which MC application server instances 340 should be used. For example, SPFs 360 may help determine which MC application server instance 340 should be assigned as a CASI for a connection-specific data path, or which MC application server instance 340 should be assigned as a FASI for a flow-specific data path.

AMEs 370 may be responsible for authenticating UEs 310 and may host corresponding functionalities. AMEs 370 may comprise an authentication, authorization, and accounting server for performing authentication, or may be communicatively coupled to such an authentication, authorization, and accounting server for performing authentication.

SMEs 380 may be responsible for subscription-related CN functions. SMEs 380 may be communicatively coupled to or may otherwise have an interface with a Home Subscriber Server of an EPC.

Figure 4:
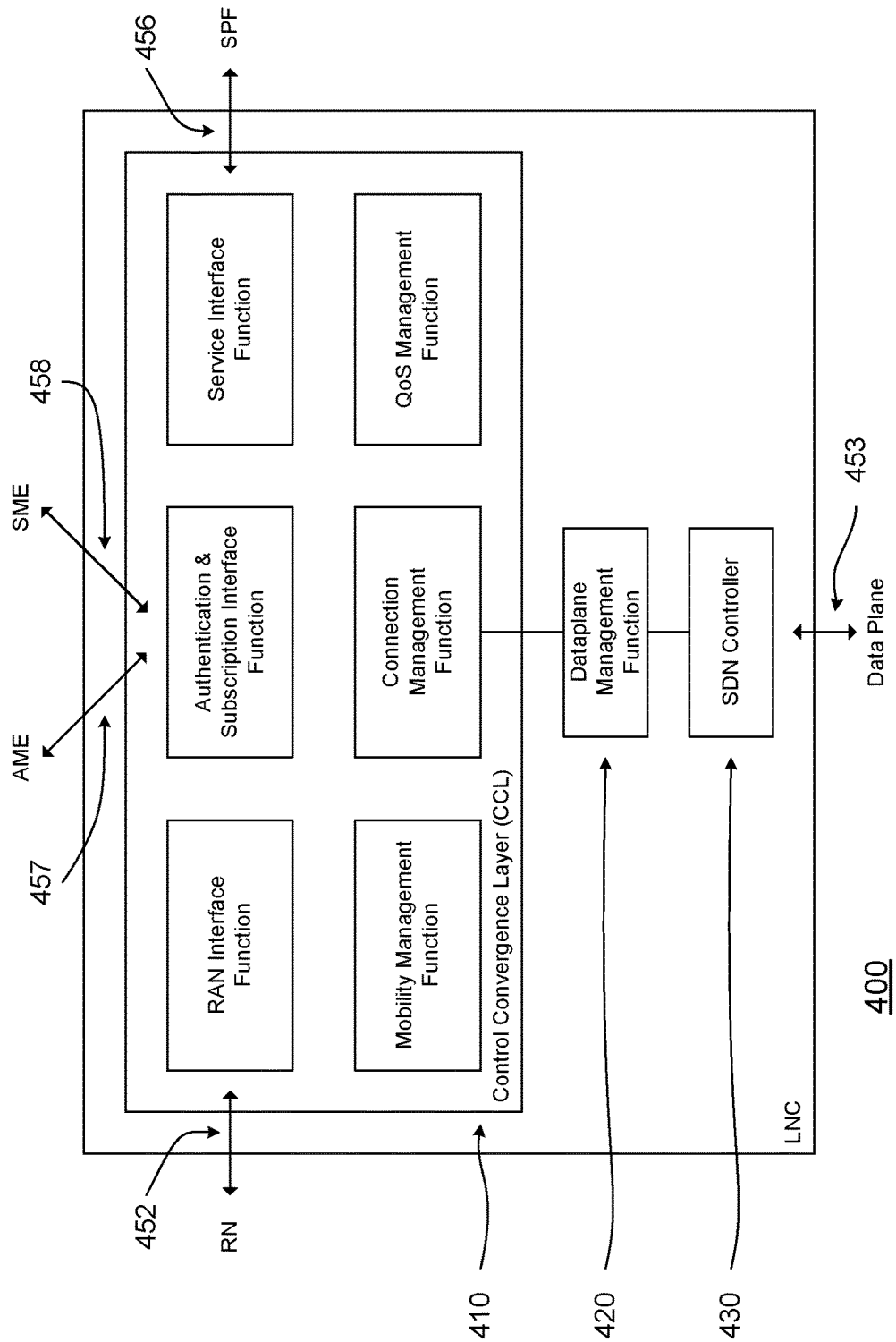
FIG. 4 illustrates an example of various functions within a Logical Network Controller (LNC), in accordance with some embodiments of the disclosure.

An LNC may comprise several functions relevant to overall CN operations. FIG. 4 illustrates an example of various functions within an LNC, in accordance with some embodiments of the disclosure. An LNC 400 may comprise a Control Convergence Layer (CCL) 410, a Dataplane Management Function 420, and an SDN Controller 430. CCL 410 may implement one or more functions, such as a RAN Interface Function, an Authentication and Subscription Interface Function, a Service Interface Function, a Mobility Management Function, a Connection Management Function, and/or a QoS Management Function. The functions of CCL 410 may communicate with each other to perform needed functionalities. The LNC 400 may also comprise an LNC/RN interface 452, LNC/data plane interface 453, an LNC/SPF interface 456, an LNC/AME interface 457, and/or an LNC/SME interface 458. LNC 400 may be substantially similar to LNCs 350.

Figure 5:
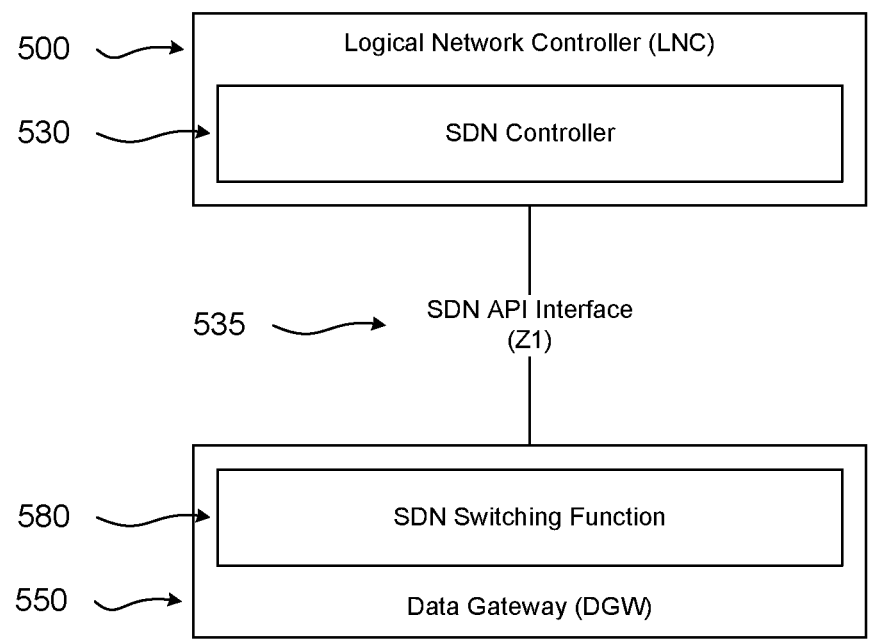
FIG. 5 illustrates an LNC, a Data Gateway (DGW), and an interface coupling the LNC and the DGW, in accordance with some embodiments of the disclosure.

An LNC may comprise one or more SDN compliant interfaces (e.g., OpenFlow-based interfaces) with one or more DGWs. FIG. 5 illustrates an LNC, a DGW, and an interface coupling the LNC and the DGW, in accordance with some embodiments of the disclosure. An SDN controller 530 in an LNC 500 may comprise an interface 535 (which may be referred to as a Z1 interface) with an SDN Switching Function 580 in a DGW 550. In some embodiments, interface 535 may be an SDN API interface. For some embodiments, interface 535 may be a Low-Throughput Networks (LTN) interface. LNC 500 may be substantially similar to LNCs 350 (and/or LNC 400).

Interface 535 may couple SDN Controller 530 and SDN Switching Function 580, and may be used to transport switching configurations to DGW 550. Interface 535 may also be used to report statistics and/or transmit status reports from DGW 550 to LNC 500 in accordance with allowed SDN APIs.

Figure 6:
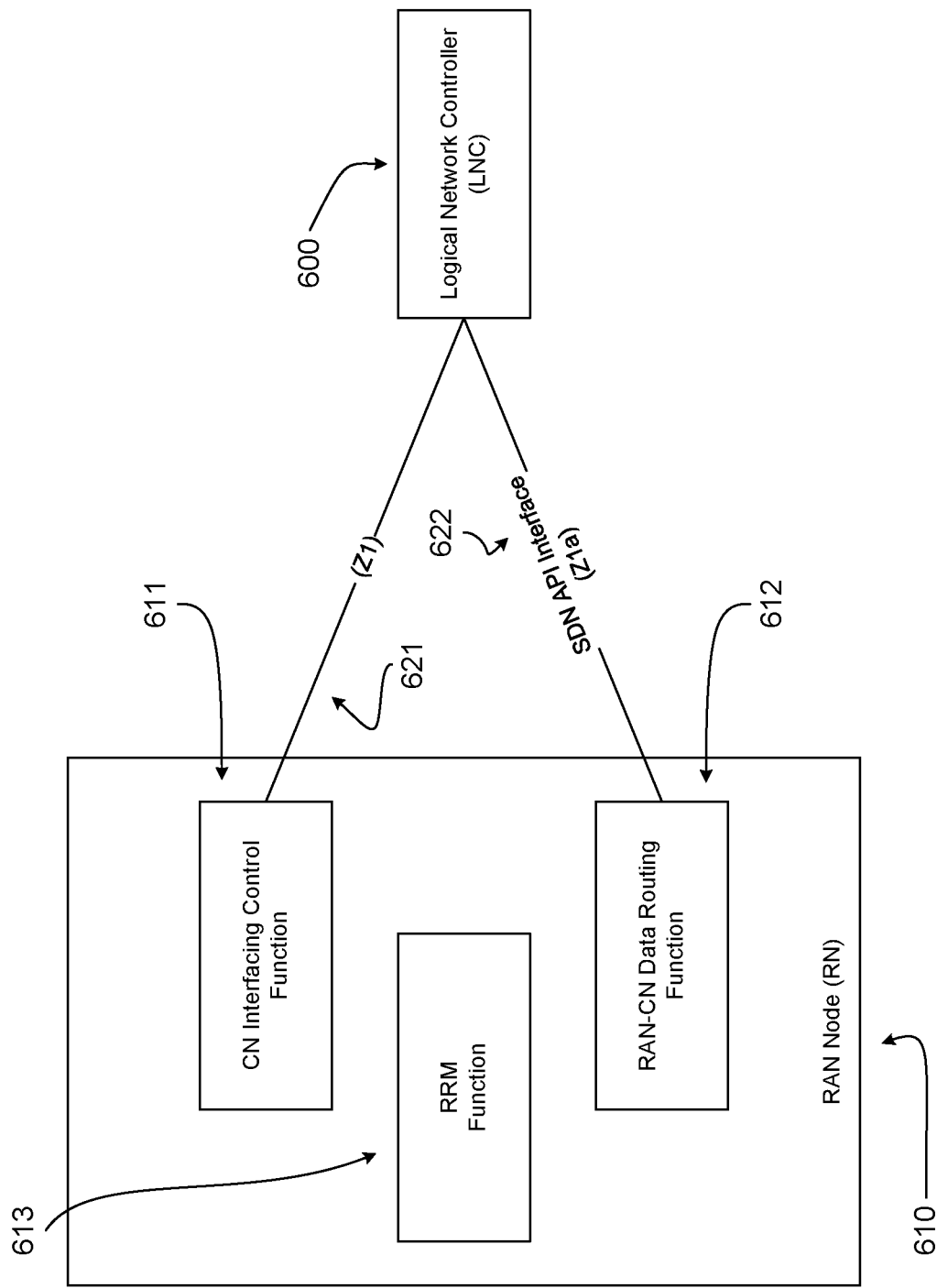
FIG. 6 illustrates a Radio Access Network (RAN) Node (RN), an LNC, and two interface coupling the RN and the LNC, in accordance with some embodiments of the disclosure.

FIG. 6 illustrates an RN, an LNC, and two interfaces coupling the RN and the LNC, in accordance with some embodiments of the disclosure. An LNC 600 may be coupled to an RN 610. RN 610 may comprise a CN interfacing control function 611, a RAN-CN data routing function 612, and/or a Radio Resource Management (RRM) function 613. A first interface 621 (which may be referred to as a Z1 interface) may couple LNC 600 to CN interfacing control function 611, and a second interface 622 (which may be referred to as a Z1a interface) may couple LNC 600 to RAN-CN data routing function 612. LNC 600 may be substantially similar to LNCs 350 (and/or LNC 400, and/or LNC 500), and RN 610 may be substantially similar to RNs 320.

RN 610 may implement radio resource functionalities. RAN-CN data routing function 612 may be a CN-facing functionality responsible for routing packets between a CN part of a network and radio parts of the network. RAN-CN data routing function 612 may implement an SDN switching functionality and may interface with an SDN controller in LNC 600 through second interface 622. First interface 621 may be used for exchanging control signaling. Second interface 622 may be used for configuring packet routing between a radio layer and a CN. First interface 621 and second interface 622 may be separate interfaces.

Figure 7:
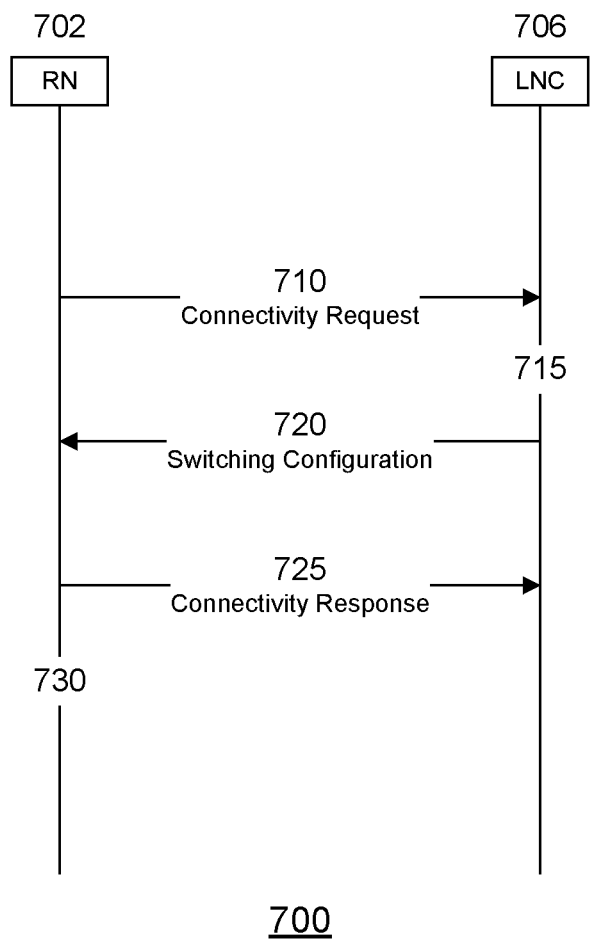
FIG. 7 illustrates a flow diagram of interaction between an RN and an LNC during User Equipment (UE) connectivity establishment, in accordance with some embodiments of the disclosure.

FIG. 7 illustrates a flow diagram of interaction between an RN and an LNC during UE connectivity establishment, in accordance with some embodiments of the disclosure. To obtain a service through an MC-IoT CN, a UE may first establish connectivity with an MC-IoT service. Once connectivity with the MC-IoT service is established, data flows may be added between the UE and the service. Establishment of connectivity may create a communication path between a UE and an MC application server instance. The communication path may be persistent, and may remain active until explicitly ended by either the UE or the MC application server instance.

Communication between an RN and an LNC during connection establishment between a UE and an MC application server instance is abstracted in FIG. 7. In protocol 700, an RN 702 and an LNC 706 communicate to establish connectivity between a UE and an MC-IoT service.

In an action 710, a connectivity request (which may have originated at a UE) may be forwarded by RN 702 to LNC 706. In an action 715, LNC 706 may participate in a CN side protocol for establishing connectivity in response to the connectivity request. In an action 720, a switching configuration may be transmitted by LNC 706 to RN 702 over a Z1a interface. The switching configuration may map traffic addressed from a connection-specific IP address for a UE and addressed to a connection-specific IP address for a server (e.g., a CASI) into an SDN switch port number. The switching configuration may also map traffic addressed from a connection-specific IP address for a server (e.g., a CASI) and addressed to a connection-specific IP address for a UE into an internal port number that faces the RAN.

In an action 725, a connectivity response may be transmitted by RN 702 to LNC 706. The connectivity response may complete the establishment of a connection-specific data path between a UE and an MC application server instance, and may establish a connection-specific IP address for a UE and/or an MC application server instance. In various embodiments, a connectivity response may establish one or more values of five-tuple of values comprising a source IP address, a source port number, a destination IP address, a destination IP number, and/or an IP protocol. In an action 730, RN 702 may participate in a radio-side resource mapping.

Figure 8:
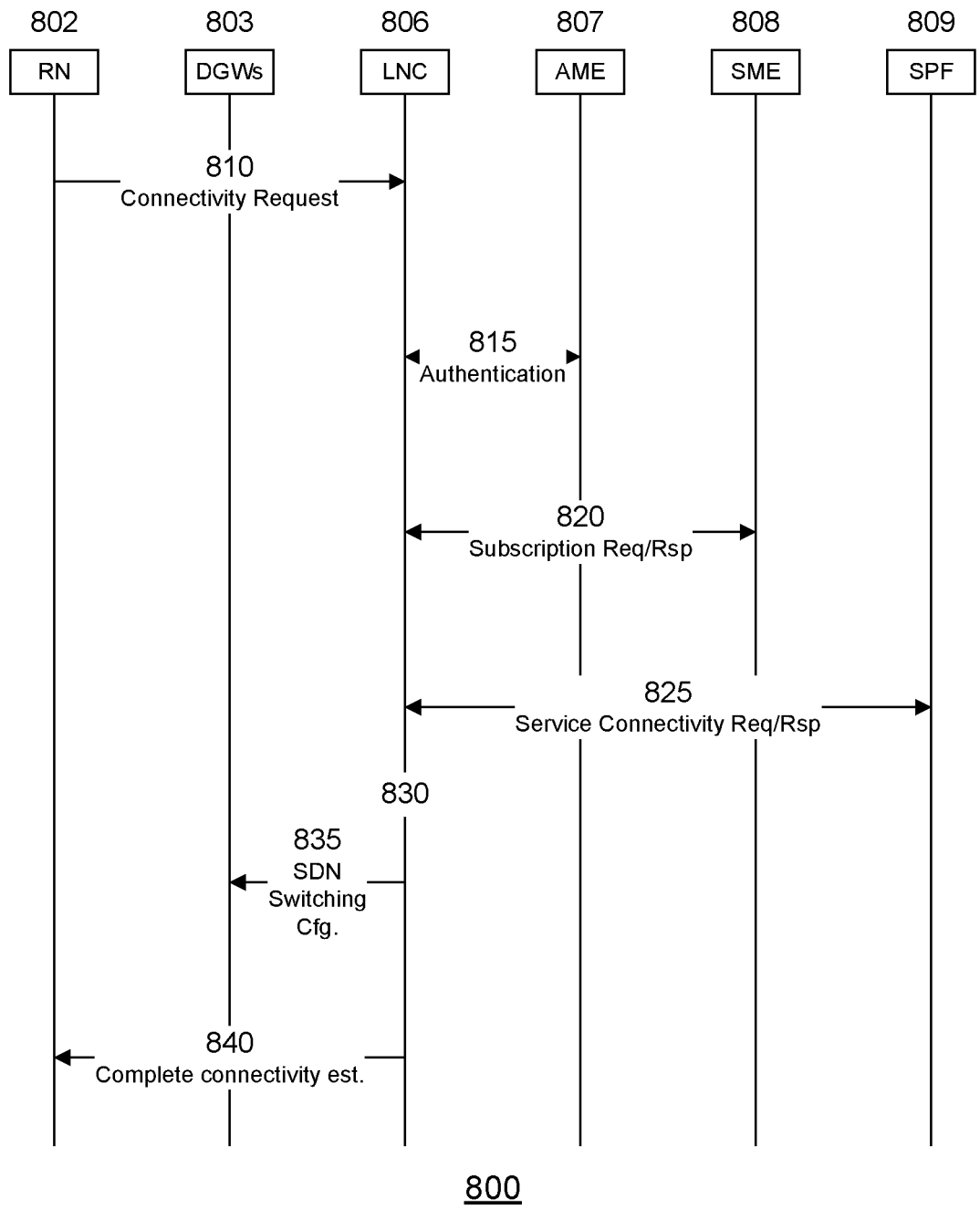
FIG. 8 illustrates a flow diagram of interaction between an RN, various DGWs, an LNC, an Authentication Management Entity (AME), a Subscription Management Entity (SME), and a Service Portal Function (SPF) in a Core Network (CN) side protocol for establishing connectivity in response to a connectivity request from a UE, in accordance with some embodiments of the disclosure.

FIG. 8 illustrates a flow diagram of interaction between an RN, various DGWs, an LNC, an AME, an SME, and an SPF in a CN side protocol for establishing connectivity in response to a connectivity request from a UE, in accordance with some embodiments of the disclosure. In protocol 800, an RN 802, one or more DGWs 803, an LNC 806, an AME 807, an SME 808, and an SPF 809 may interact to establish connectivity in response to a connectivity request from a UE.

In an action 810, a connectivity request (which may have originated at a UE) may be forwarded by RN 802 to LNC 806. The connectivity request may identify a service ID of an MC service that the UE is trying to connect to. The connectivity request may also furnish one or more security credentials for authentication. In an action 815, an authentication based upon the security credentials may be performed between LNC 806 and AME 807. In an action 820, LNC 806 may request subscription information from SME 808, which may then respond to the request. In an action 825, LNC 806 may request service connectivity from SPF 809, which may then respond to the request.

In an action 830, LNC 806 may determine an MC application server for the connectivity request. In determining the connection-specific MC application server (e.g., a CASI), LNC 806 may compute and select an optimal data path to satisfy a latency requirement and/or a reliability requirement for the connection. In some embodiments, different connection-specific data paths may be established for Uplink (UL) traffic and Downlink (DL) traffic. In some such embodiments, the transition DGW (e.g., the DGW directly interfacing with the PDN of the connection-specific MC application server instance) may be the same for both UL and DL traffic. LNC 806 may select a connection-specific IP address for the UE based upon a subnet configuration of a transition DGW for the identified optimal data path. LNC 806 may then determine switching configurations for one or more DGWs 803 on the selected connection-specific data path (or, for some embodiments, the selected, separate UL data path and DL data path).

After LNC 806 establishes connectivity on the CN side, it may send an SDN switching configuration to a RAN-CN data routing function in RN 802 over a Z1a interface. This may configure RN 802 to route incoming packets from the RAN side that match one or more of the five-tuples of values for the connection to appropriate DGWs 803 on the CN side. LNC 806 may also inform RN 802 about the connection-specific UE IP address and the connection-specific server IP address using control signaling over a Z1 interface.

Accordingly, in an action 835, LNC 806 may communicate, via SDN API messaging, one or more switching configuration transmissions to a set of DGWs 803 on the selected connection-specific data path. Subsequently, in an action 840, LNC may communicate with RN 802 to complete an establishment of connectivity between a UE and an MC-IoT service.

Figure 9:
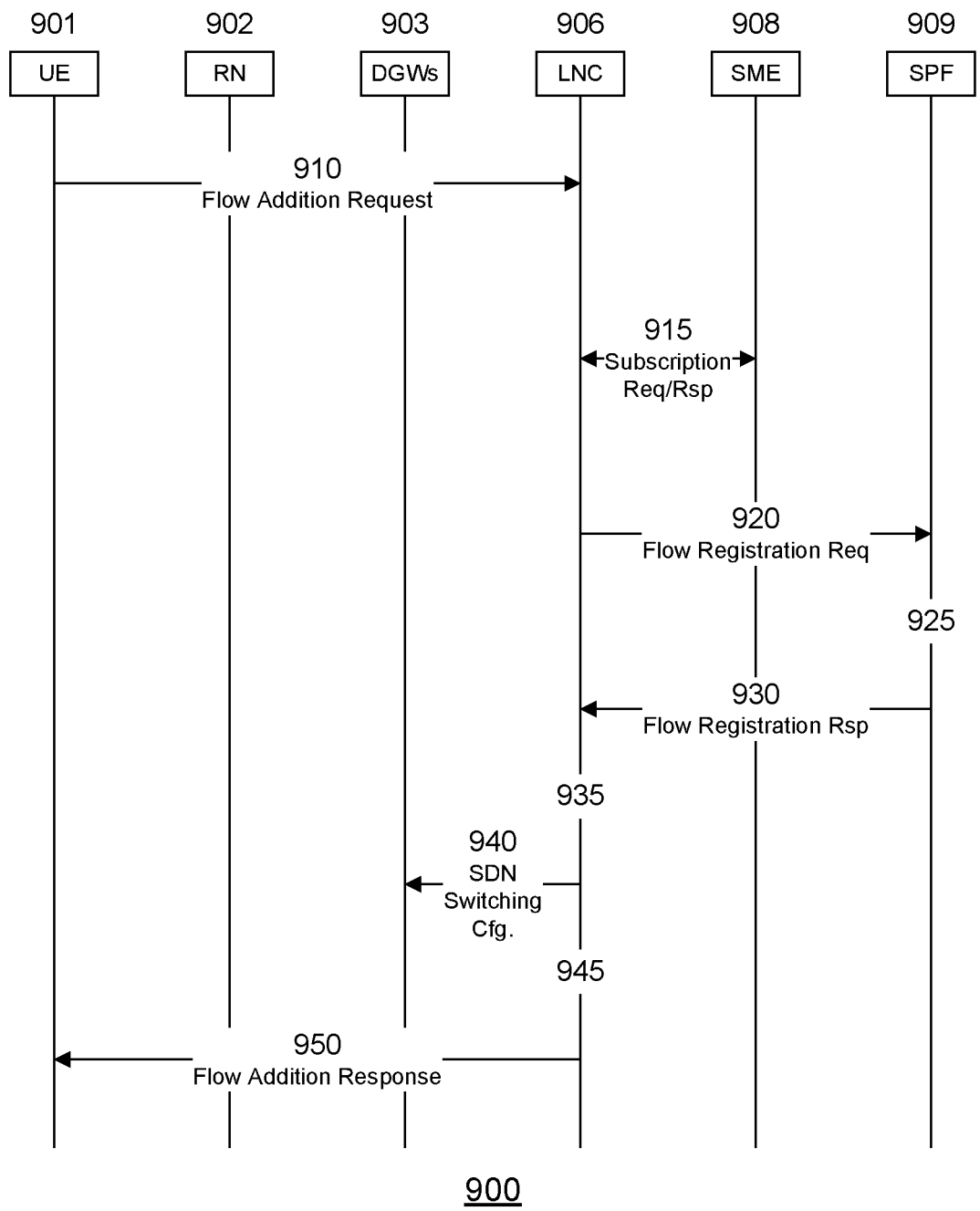
FIG. 9 illustrates a UE-initiated MC flow addition for a connected UE, in accordance with some embodiments of the disclosure.

After a connection-specific data path is established between a UE and an MC service, additional MC flow-specific data paths may be established between the UE and the service. The additional flows may have different QoS requirements than a QoS requirement of the connection-specific data path. FIG. 9 illustrates a UE-initiated MC flow addition for a connected UE, in accordance with some embodiments of the disclosure. In protocol 900, a UE 901, an RN 902, one or more DGWs 903, an LNC 906, an SME 908, and an SPF 909 may interact to add an MC flow for UE 901 based on a flow addition request initiated by UE 901.

In an action 910, UE 901 may transmit a flow addition request to LNC 906. In an action 915, LNC 906 may request subscription information from SME 908, which may then respond to the request. In an action 920, LNC 906 may transmit a flow registration request to SPF 909 for an added flow. The flow addition request may carry service ID and/or flow profile indicators. In an action 925, SPF 909 may determine whether the added flow may be supported by the service, and may gather performance status reports from one or more preferred MC application server instances. In an action 930, SPF 809 may then transmit a flow registration response to LNC 906, which may carry IP addresses and/or performance information for preferred MC application server instances.

In an action 935, for each preferred MC application server instances (e.g., for each preferred FASI), LNC 906 may compute an optimal data path to satisfy a latency requirement and/or a reliability requirement. LNC 906 may then select an optimal data path to an optimal MC application server instance. In some embodiments, different flow-specific data paths may be established for UL and DL traffic. Subsequently, LNC 906 may select a flow-specific IP address for the UE, which may be different from a connection-specific IP address previously selected for the UE (for example, if a transition DGW for the flow is different from a transition DGW for the associated connection). LNC 906 may then determine switching configurations for one or more DGWs 903 on the selected flow-specific data path (or, for some embodiments, the selected, separate UL data path and DL data path).

In an action 940, LNC 906 may communicate, via SDN API messaging, one or more switching configuration transmissions to a set of DGWs 903 on the selected flow-specific data path. Subsequently, in an action 945, LNC 906 may perform a flow addition resource allocation in the RAN. In an action 950, LNC 906 may send a flow addition response transmission to UE 901. The flow addition response transmission may carry a flow-specific server IP address and/or a flow-specific UE IP address.

Figure 10:
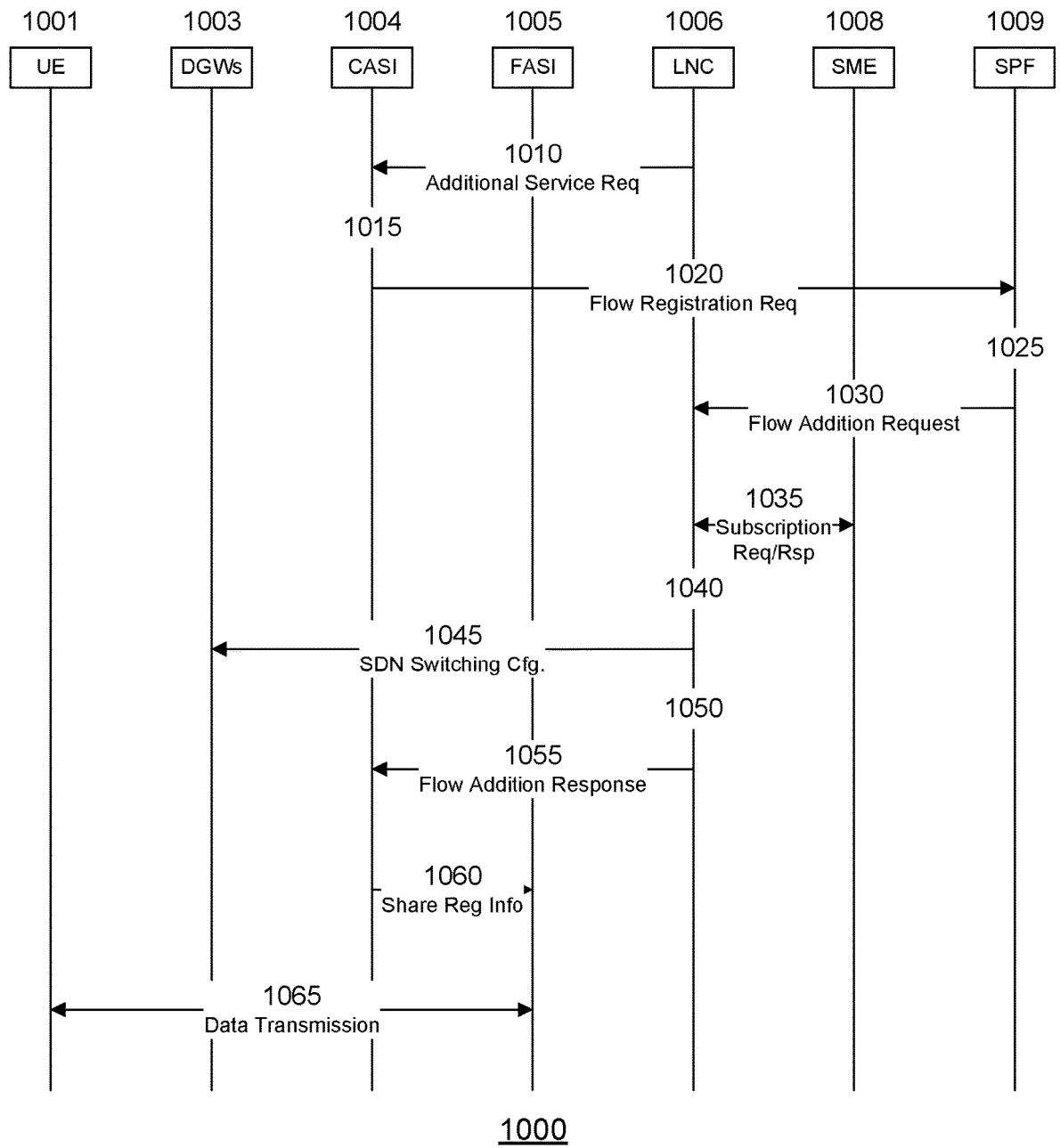
FIG. 10 illustrates a network-initiated MC flow addition for a connected UE, in accordance with some embodiments of the disclosure.

Addition of MC flows may also be network-initiated. FIG. 10 illustrates a network-initiated MC flow addition for a connected UE, in accordance with some embodiments of the disclosure. In protocol 1000, a UE 1001, one or more DGWs 1003, a CASI 1004, a FASI 1005, an LNC 1006, an SME 1008, and an SPF 1009 may interact to add an MC flow for UE 1001 based on a flow addition request initiated by a network element (e.g., CASI 1004).

In some embodiments, in an action 1010, an additional service request may be sent (from, e.g., LNC 1006) over an established connection using higher-layer signaling. (In some instances, although the network may initiate the additional service request protocol, the request may itself be triggered in response to, e.g., higher-layer signaling from UE 1001, such as higher-layer signaling from UE 1001 to CASI 1004 requesting additional service.) A higher-layer service request may include service descriptions (e.g., port numbers) and/or QoS requirements. In an action 1015, CASI 1004 may determine that a new flow is needed (e.g., for an additional service request via higher-layer signaling). In an action 1020, CASI 1004 may transmit a flow addition request to SPF 1009. The flow addition request may include flow profile information.

In an action 1025, SPF 1009 may gather performance status reports from one or more MC application server instances (e.g., one or more FASI). Then, in an action 1030, SPF 1009 may transmit a flow addition request to LNC 1006. The flow addition request may carry a service ID indicator, an IP address, performance information for preferred MC application server instances (e.g., FASIs), and/or flow profile information. In an action 1035, LNC 1006 may request subscription information from SME 1008, which may then respond to the request.

In an action 1040, for each preferred MC application server instances (e.g., for each preferred FASI), LNC 1006 may compute an optimal data path to satisfy a latency requirement and/or a reliability requirement. LNC 1006 may then select an optimal data path to the optimal MC application server instance (e.g., FASI 1005). In some embodiments, different flow-specific data paths may be established for UL and DL traffic. LNC 1006 may then select a flow-specific IP address for the UE, which may be different from a connection-specific IP address previously selected for the UE (for example, if a transition DGW for the flow is different from a transition DGW for the associated connection). LNC 1006 may then determine switching configurations for one or more DGWs 1003 on the selected flow-specific data path (or, for some embodiments, the selected, separate UL data path and DL data path).

In an action 1045, LNC 1006 may communicate, via SDN API messaging, one or more switching configuration transmissions to DGWs 1003 on the selected flow-specific data path. Subsequently, in an action 1050, LNC 1006 may perform a flow addition resource allocation in the RAN. In an action 1055, LNC 1006 may then send a flow addition response transmission to CASI 1004. The flow addition response transmission may carry a service ID, a flow-specific server IP address, and/or a flow specific UE IP address.

In an action 1060, if CASI 1004 and FASI 1005 are not the same MC application server instance, CASI 1004 may share registration and/or session information with FASI 1005. In some embodiments, FASI 1005 may then transmit to UE 1001 a response to the additional service request (e.g., if an additional service request using higher-layer signaling was triggered in response to higher-layer signaling from UE 1001 requesting additional service). Subsequently, in action 1065, data may be transmitted between UE 1001 and FASI 1005 for the flow. Various packets of the flow may carry the flow-specific server IP address and/or the flow-specific UE IP address.

Figure 11:
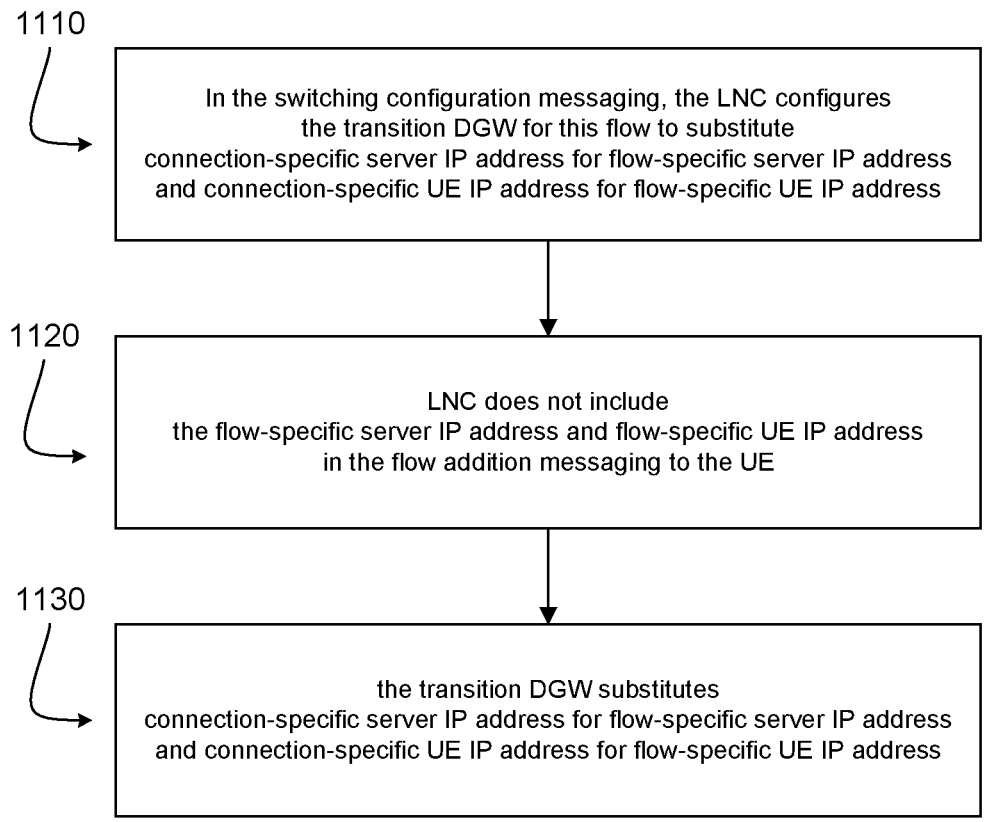
FIG. 11 illustrates modifications to flow addition procedures to accommodate UEs that may be unable to handle flow-specific Internet Protocol (IP) addresses, in accordance with some embodiments of the disclosure.

In some embodiments, higher layers in a UE might be unable to handle flow-specific IP addresses. For some such embodiments, the network may handle flow-specific IP addresses in a manner transparent to the UE. The UE may accordingly be aware of only one IP address for the MC application server instance and one IP address for itself when connected to the service. FIG. 11 illustrates modifications to flow addition procedures to accommodate UEs that may be unable to handle flow-specific IP addresses, in accordance with some embodiments of the disclosure.

In a modification 1110, in the switching configuration messaging, an LNC may configure a transition DGW for a flow to substitute a connection-specific server IP address for a flow-specific server IP address, and to substitute a connection-specific UE IP address for a flow-specific UE IP address. In a modification 1120, an LNC may not include a flow-specific server IP address and a flow-specific UE IP address in flow addition messaging to a UE. In a modification 1130, a transition DGW may substitute a connection-specific server IP address for a flow-specific server IP address, and may substitute a connection-specific UE IP address for a flow-specific UE IP address.

Figure 12:
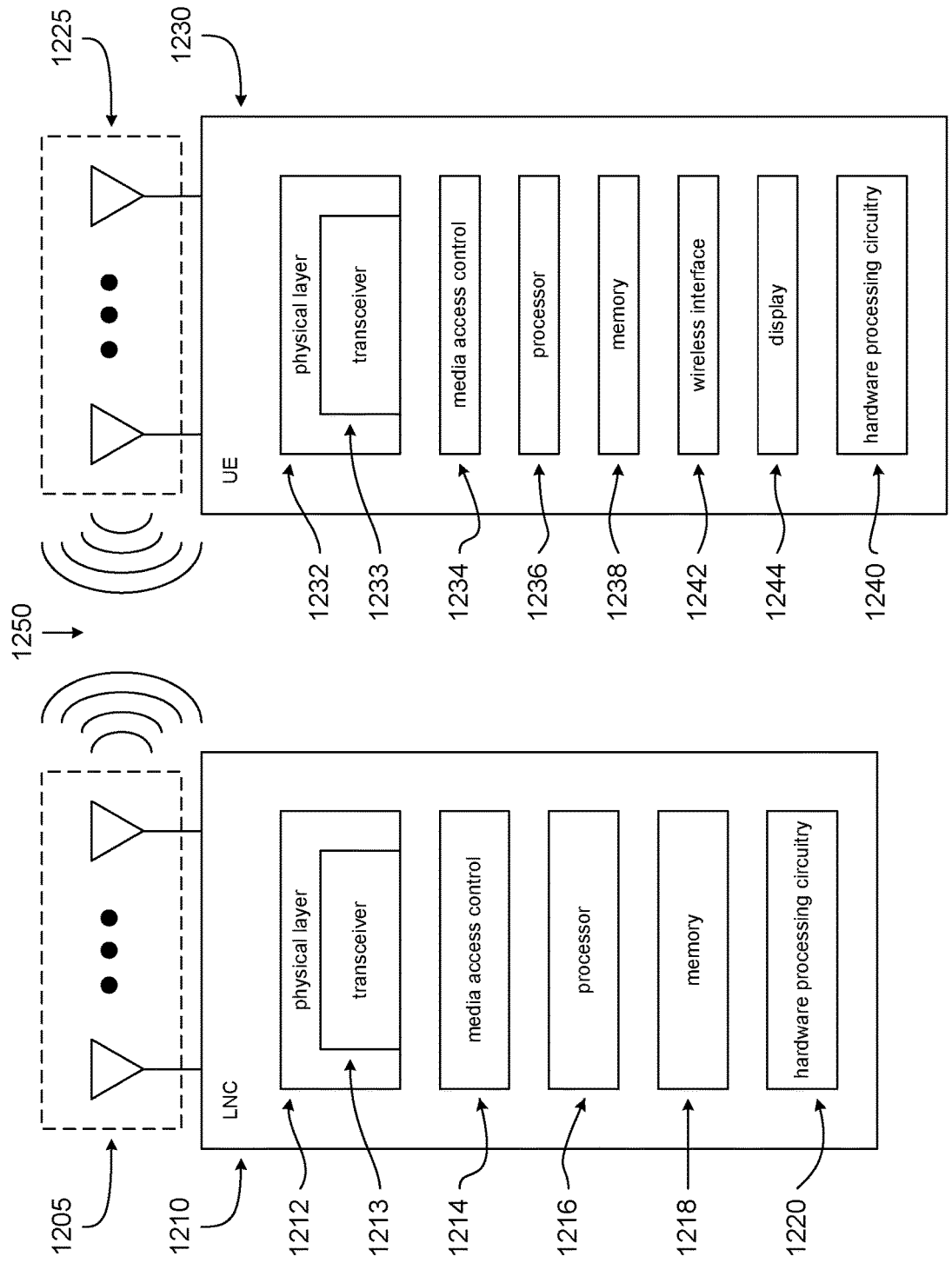
FIG. 12 illustrates an LNC and a UE, in accordance with some embodiments of the disclosure.

FIG. 12 illustrates an LNC and a UE, in accordance with some embodiments of the disclosure. An LNC 1210 and a UE 1230 may be operable to co-exist with each other and other elements of an LTE network. High-level, simplified architectures of LNC 1210 and UE 1230 are described so as not to obscure the embodiments. It should be noted that in some embodiments, LNC 1210 may be a stationary non-mobile device. In some embodiments, LNC 1210 may comprise an eNB or another base station, such as a 5G base station.

LNC 1210 is coupled to one or more antennas 1205, and UE 1230 is similarly coupled to one or more antennas 1225. However, in some embodiments, LNC 1210 may incorporate or comprise antennas 1205, and UE 1230 in various embodiments may incorporate or comprise antennas 1225.

In some embodiments, antennas 1205 and/or antennas 1225 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 1205 are separated to take advantage of spatial diversity.

LNC 1210 and UE 1230 are operable to communicate with each other on a network, such as a wireless network. LNC 1210 and UE 1230 may be in communication with each other over a wireless communication channel 1250, which has both a downlink path from LNC 1210 to UE 1230 and an uplink path from UE 1230 to LNC 1210.

As illustrated in FIG. 12, in some embodiments, LNC 1210 may include a physical layer circuitry 1212, a MAC (media access control) circuitry 1214, a processor 1216, a memory 1218, and a hardware processing circuitry 1220. A person skilled in the art will appreciate that other components not shown may be used in addition to the components shown to form a complete LNC.

In some embodiments, physical layer circuitry 1212 includes a transceiver 1213 for providing signals to and from UE 1230. Transceiver 1213 provides signals to and from UEs or other devices using one or more antennas 1205. In some embodiments, MAC circuitry 1214 controls access to the wireless medium. Memory 1218 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 1220 may comprise logic devices or circuitry to perform various operations. In some embodiments, processor 1216 and memory 1218 are arranged to perform the operations of hardware processing circuitry 1220, such as operations described herein with reference to logic devices and circuitry within LNC 1210 and/or hardware processing circuitry 1220.

Accordingly, in some embodiments, LNC 1210 may be a device comprising an application processor, a memory, one or more antenna ports, and an interface for allowing the application processor to communicate with another device.

As is also illustrated in FIG. 12, in some embodiments, UE 1230 may include a physical layer circuitry 1232, a MAC circuitry 1234, a processor 1236, a memory 1238, a hardware processing circuitry 1240, a wireless interface 1242, and a display 1244. A person skilled in the art would appreciate that other components not shown may be used in addition to the components shown to form a complete UE.

In some embodiments, physical layer circuitry 1232 includes a transceiver 1233 for providing signals to and from LNC 1210 (as well as other LNCs). Transceiver 1233 provides signals to and from LNCs or other devices using one or more antennas 1225. In some embodiments, MAC circuitry 1234 controls access to the wireless medium. Memory 1238 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 1242 may be arranged to allow the processor to communicate with another device. Display 1244 may provide a visual and/or tactile display for a user to interact with UE 1230, such as a touch-screen display. Hardware processing circuitry 1240 may comprise logic devices or circuitry to perform various operations. In some embodiments, processor 1236 and memory 1238 may be arranged to perform the operations of hardware processing circuitry 1240, such as operations described herein with reference to logic devices and circuitry within UE 1230 and/or hardware processing circuitry 1240.

Accordingly, in some embodiments, UE 1230 may be a device comprising an application processor, a memory, one or more antennas, a wireless interface for allowing the application processor to communicate with another device, and a touch-screen display.

Elements of FIG. 12, and elements of other figures having the same names or reference numbers, can operate or function in the manner described herein with respect to any such figures (although the operation and function of such elements is not limited to such descriptions). For example, FIGS. 13-14 and 17 also depict embodiments of LNCs, hardware processing circuitry of LNCs, UEs, and/or hardware processing circuitry of UEs, and the embodiments described with respect to FIG. 12 and FIGS. 13-14 and 17 can operate or function in the manner described herein with respect to any of the figures.

In addition, although LNC 1210 and UE 1230 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

An LNC may include various hardware processing circuitries discussed below (such as hardware processing circuitry 1300 of FIG. 13), which may in turn comprise logic devices and/or circuitry operable to perform various operations. For example, with reference to FIG. 12, LNC 1210 (or various elements or components therein, such as hardware processing circuitry 1220, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 1216 (and/or one or more other processors which LNC 1210 may comprise), memory 1218, and/or other elements or components of LNC 1210 (which may include hardware processing circuitry 1220) may be arranged to perform the operations of these hardware processing circuitries, such as operations described herein with reference to devices and circuitry within these hardware processing circuitries. In some embodiments, processor 1216 (and/or one or more other processors which LNC 1210 may comprise) may be a baseband processor.

A UE may include various hardware processing circuitries discussed below (such as hardware processing circuitry 1400 of FIG. 14), which may in turn comprise logic devices and/or circuitry operable to perform various operations. For example, with reference to FIG. 12, UE 1230 (or various elements or components therein, such as hardware processing circuitry 1240, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 1236 (and/or one or more other processors which UE 1230 may comprise), memory 1238, and/or other elements or components of UE 1230 (which may include hardware processing circuitry 1240) may be arranged to perform the operations of these hardware processing circuitries, such as operations described herein with reference to devices and circuitry within these hardware processing circuitries. In some embodiments, processor 1236 (and/or one or more other processors which UE 1230 may comprise) may be a baseband processor.

Figure 15:
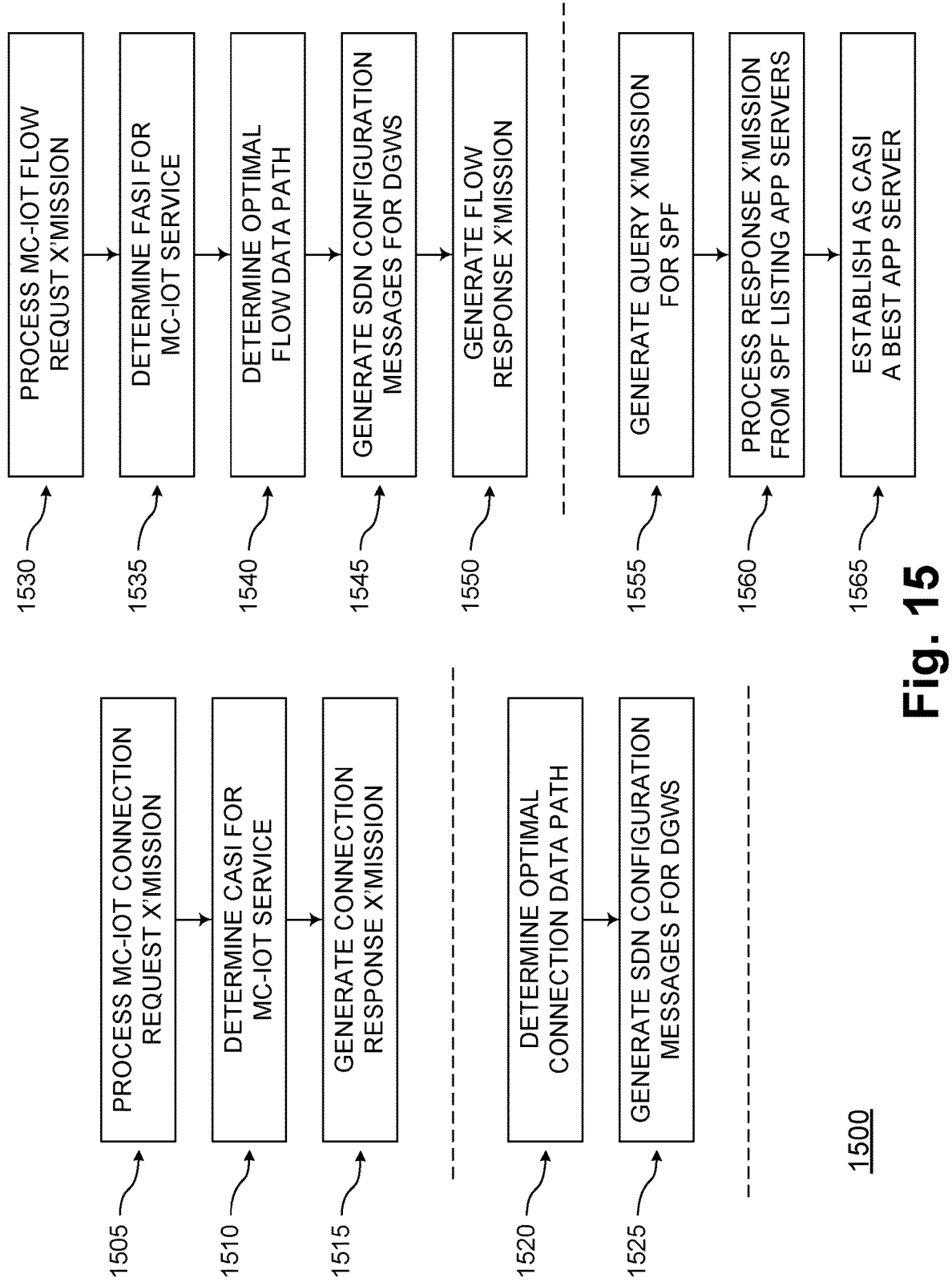
FIG. 15 illustrates methods for an LNC to support MC-IoT applications, in accordance with some embodiments of the disclosure.

Various methods that may relate to LNC 1210 and hardware processing circuitry 1220 are discussed below. Although the actions in flowchart 1500 with reference to FIG. 15 are shown in a particular order, the order of the actions can be modified. Thus, the illustrated embodiments can be performed in a different order, and some actions may be performed in parallel. Some of the actions and/or operations listed in FIG. 15 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause LNC 1210 and/or hardware processing circuitry 1220 to perform an operation comprising the methods of FIG. 15. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 15.

Figure 16:
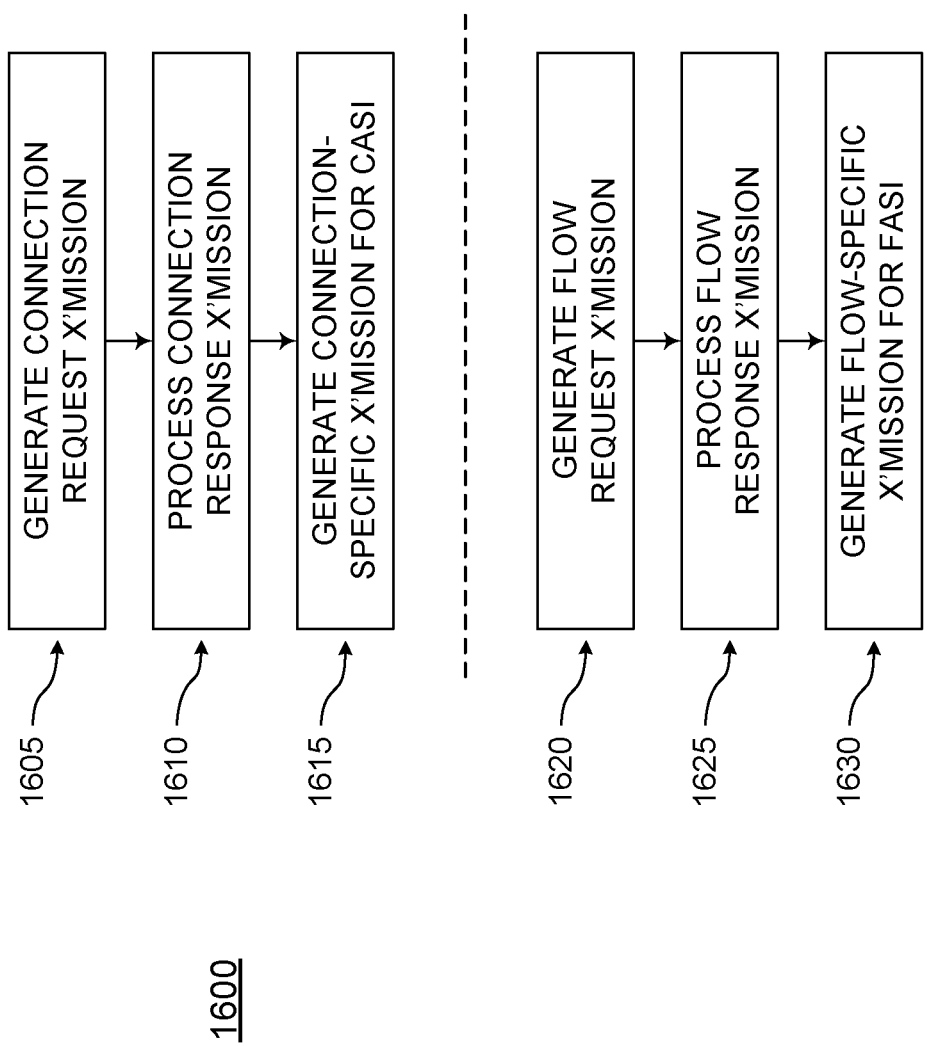
FIG. 16 illustrates methods for a UE to support MC-IoT applications, in accordance with some embodiments of the disclosure.

Various methods that may relate to UE 1230 and hardware processing circuitry 1240 are discussed below. Although the actions in the flowchart 1600 with reference to FIG. 16 are shown in a particular order, the order of the actions can be modified. Thus, the illustrated embodiments can be performed in a different order, and some actions may be performed in parallel. Some of the actions and/or operations listed in FIG. 16 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 1230 and/or hardware processing circuitry 1240 to perform an operation comprising the methods of FIG. 16. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 16.

Figure 13:
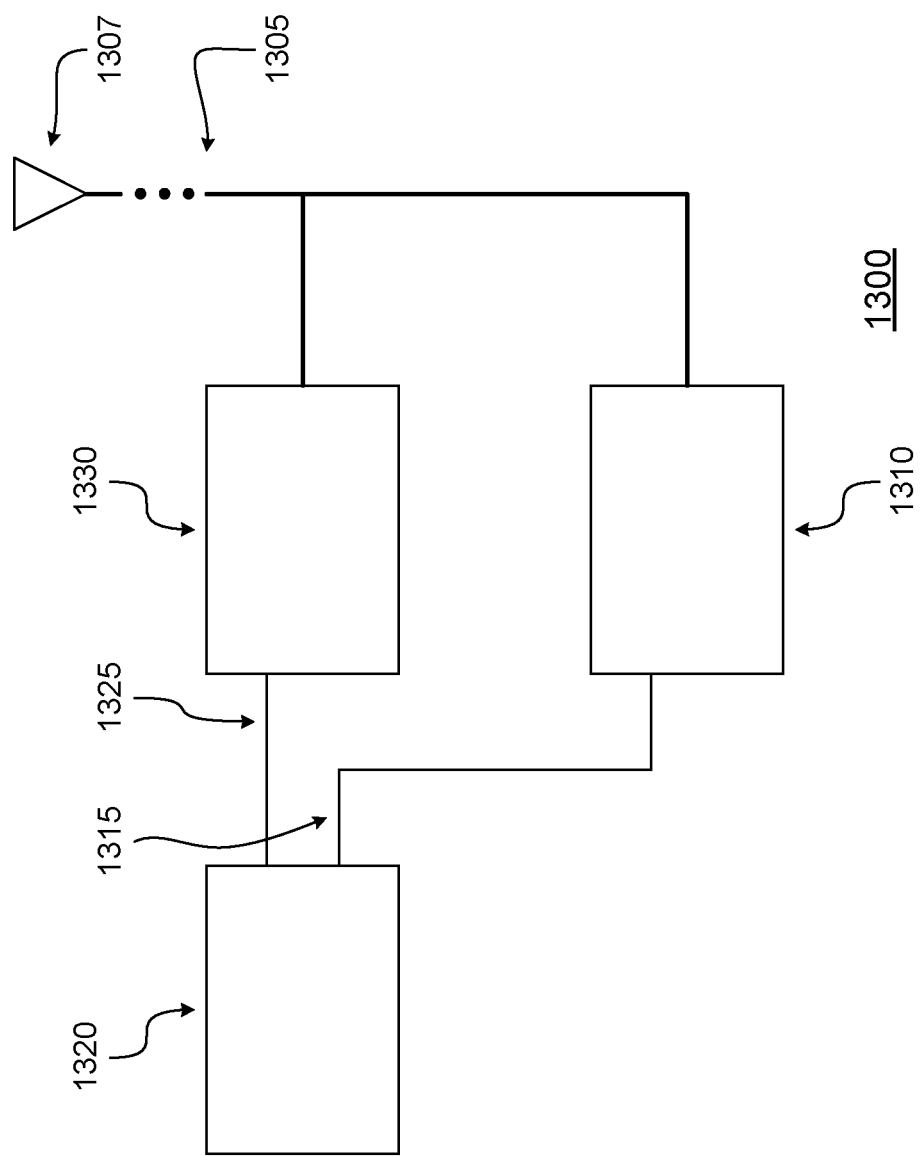
FIG. 13 illustrates hardware processing circuitries for an LNC to support MC-IoT applications, in accordance with some embodiments of the disclosure.

FIG. 13 illustrates hardware processing circuitries for an LNC to support MC-IoT applications, in accordance with some embodiments of the disclosure. An apparatus of LNC 1210 (or an eNB or other base station), which may be operable to communicate with one or more UEs on a wireless network, may comprise hardware processing circuitry 1300. In some embodiments, hardware processing circuitry 1300 may comprise one or more antenna ports 1305 operable to provide various transmissions over a wireless communication channel (such as wireless communication channel 1250). Antenna ports 1305 may be coupled to one or more antennas 1307 (which may be antennas 1205). In some embodiments, hardware processing circuitry 1300 may incorporate antennas 1307, while in other embodiments, hardware processing circuitry 1300 may merely be coupled to antennas 1307.

Antenna ports 1305 and antennas 1307 may be operable to provide signals from an LNC to a wireless communications channel and/or a UE, and may be operable to provide signals from a UE and/or a wireless communications channel to an LNC. For example, antenna ports 1305 and antennas 1307 may be operable to provide transmissions from LNC 1210 to wireless communication channel 1250 (and from there to UE 1230, or to another UE). Similarly, antennas 1307 and antenna ports 1305 may be operable to provide transmissions from a wireless communication channel 1250 (and beyond that, from UE 1230, or another UE) to LNC 1210.

With reference to FIG. 13, hardware processing circuitry 1300 may comprise a first circuitry 1310, a second circuitry 1320, and a third circuitry 1330. First circuitry 1310 may be operable to process a connection request transmission from the UE requesting a connection with an MC-IoT service. First circuitry 1310 may transmit to second circuitry 1320, via an interface 1315, information regarding the connection request transmission. Second circuitry 1320 may be operable to determine a CASI for the MC-IoT service. Second circuitry 1320 may transmit to third circuitry 1330, via an interface 1325, information regarding the CASI (such as a connection-specific source IP address corresponding to the UE, and/or a connection-specific destination IP address corresponding to the CASI). Third circuitry 1330 may be operable to generate a connection response transmission for the UE carrying a connection-specific source IP address corresponding to the UE and a connection-specific destination IP address corresponding to the CASI.

In some embodiments, second circuitry 1320 may be operable to determine an optimal connection data path for a connection over the wireless network. For some embodiments, third circuitry 1330 may be operable to generate one or more SDN connection configuration messages corresponding respectively to one or more DGWs on the optimal connection data path. For some embodiments, the one or more SDN connection configuration messages may configure a non-tunneling data flow through the one or more DGWs. In some embodiments, the optimal connection data path may be determined based on at least one of a latency requirement and a reliability requirement.

In some embodiments, first circuitry 1310 may be operable to process a flow request transmission from the UE requesting a flow with an MC-IoT service. Second circuitry 1320 may then be operable to determine a FASI for the MC-IoT service, and may also be operable to determine an optimal flow data path for a flow over the wireless network. Third circuitry 1330 may be operable to generate one or more SDN flow configuration messages corresponding respectively to one or more DGWs on the optimal flow data path, and may also be operable to generate a flow response transmission for the UE carrying a flow-specific source IP address corresponding to the UE and a flow-specific destination IP address corresponding to the FASI.

For some embodiments, third circuitry 1330 may be operable to generate a query transmission for an SPF. First circuitry 1310 may then be operable to process a response transmission from the SPF carrying a list of one or more application servers and a list of one or more respectively corresponding performance indicators. Second circuitry 1320 may thereafter be operable to establish as the CASI a best application server of the one or more application servers based upon the one or more respectively corresponding performance indicators.

In some embodiments, first circuitry 1310, second circuitry 1320, and third circuitry 1330 may be implemented as separate circuitries. In other embodiments, one or more of first circuitry 1310, second circuitry 1320, and third circuitry 1330 may be combined and implemented together in a circuitry without altering the essence of the embodiments.

Figure 14:
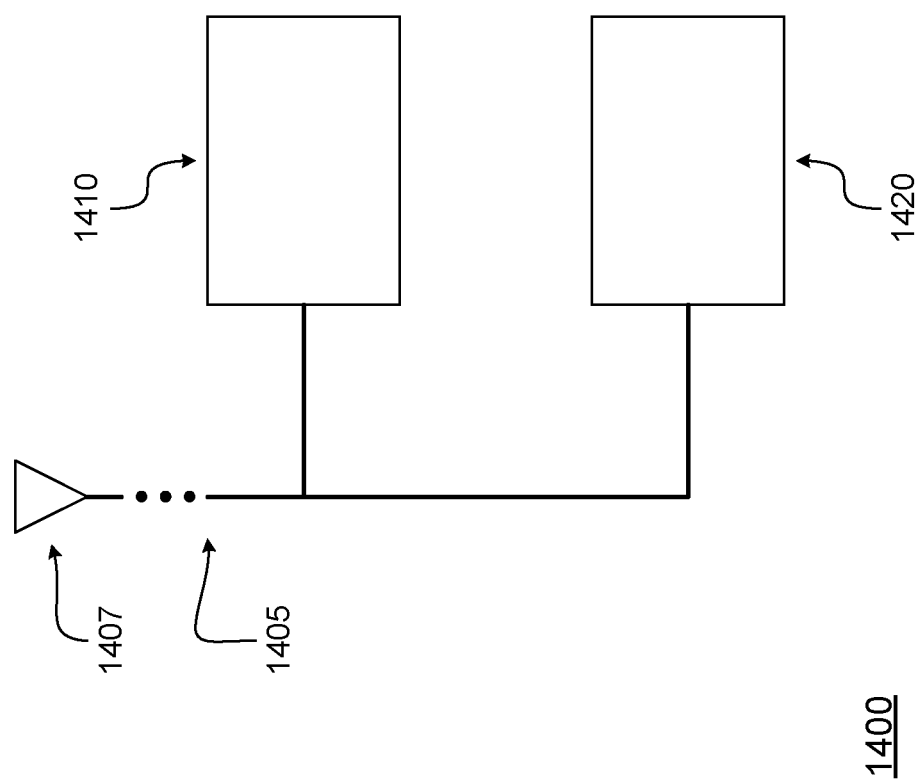
FIG. 14 illustrates hardware processing circuitries for a UE to support MC-IoT applications, in accordance with some embodiments of the disclosure.

FIG. 14 illustrates hardware processing circuitries for a UE to support MC-IoT applications, in accordance with some embodiments of the disclosure. An apparatus of UE 1230 (or another UE or mobile handset), which may be operable to communicate with one or more LNCs on a wireless network, may comprise hardware processing circuitry 1400. In some embodiments, hardware processing circuitry 1400 may comprise one or more antenna ports 1405 operable to provide various transmissions over a wireless communication channel (such as wireless communication channel 1250). Antenna ports 1405 may be coupled to one or more antennas 1407 (which may be antennas 1225). In some embodiments, hardware processing circuitry 1400 may incorporate antennas 1407, while in other embodiments, hardware processing circuitry 1400 may merely be coupled to antennas 1407.

Antenna ports 1405 and antennas 1407 may be operable to provide signals from a UE to a wireless communications channel and/or an LNC, and may be operable to provide signals from an LNC and/or a wireless communications channel to a UE. For example, antenna ports 1405 and antennas 1407 may be operable to provide transmissions from UE 1230 to wireless communication channel 1250 (and from there to LNC 1210, or to another LNC). Similarly, antennas 1407 and antenna ports 1405 may be operable to provide transmissions from a wireless communication channel 1250 (and beyond that, from LNC 1210, or another LNC) to UE 1230.

With reference to FIG. 14, hardware processing circuitry 1400 may comprise a first circuitry 1410 and a second circuitry 1420. First circuitry 1410 may be operable to generate a connection request transmission for the LNC requesting a connection with an MC-IoT service. Second circuitry 1420 may be operable to process a connection response transmission from the LNC carrying a connection-specific destination IP address corresponding to a CASI for the MC-IoT service. First circuitry 1410 may additionally be operable to generate a connection-specific transmission for the CASI, the connection-specific transmission carrying the connection-specific destination IP address.

In some embodiments, the connection response transmission may carry a connection-specific source IP address corresponding to the UE, and the connection-specific transmission for the CASI may carry the connection-specific source IP address.

For some embodiments, first circuitry 1410 may be operable to generate a flow request transmission for the LNC requesting a flow with the MC-IoT service. In some embodiments, second circuitry 1420 may be operable to process a flow response transmission from the LNC carrying a flow-specific destination IP address corresponding to a FASI for the MC-IoT service. First circuitry 1410 may also be operable to generate a flow-specific transmission for the FASI, the flow-specific transmission carrying the flow-specific destination IP address.

In some embodiments, the flow response transmission may carry a flow-specific source IP address corresponding to the UE, and the flow-specific transmission for the FASI may carry the flow-specific source IP address.

For some embodiments, the CASI and the FASI may be different application server instances.

In some embodiments, first circuitry 1410 and second circuitry 1420 may be implemented as separate circuitries. In other embodiments, one or more of first circuitry 1410 and second circuitry 1420 may be combined and implemented together in a circuitry without altering the essence of the embodiments.

FIG. 15 illustrates methods for an LNC to support MC-IoT applications, in accordance with some embodiments of the disclosure. A method 1500 may comprise a processing 1505, a determining 1510, a generating 1515, a determining 1520, a generating 1525, a processing 1530, a determining 1535, a determining 1540, a generating 1545, a generating 1550, a generating 1555, a processing 1560, and/or an establishing 1565.

In processing 1505, a connection request transmission from a UE requesting a connection with an MC-IoT service may be processed for an LNC. In determining 1510, a CASI for the MC-IoT service may be determined. In generating 1515, a connection response transmission for the UE carrying a connection-specific source IP address corresponding to the UE and a connection-specific destination IP address corresponding to the CASI may be generated.

For some embodiments, in determining 1520, an optimal connection data path for a connection over the wireless network may be determined. In generating 1525, one or more SDN connection configuration messages corresponding respectively to one or more DGWs on the optimal connection data path may be generated. In some embodiments, the one or more SDN connection configuration messages may configure a non-tunneling data flow through the one or more DGWs. For some embodiments, the optimal connection data path may be determined based on at least one of a latency requirement and a reliability requirement.

In some embodiments, in processing 1530, a flow request transmission from the UE requesting a flow with the MC-IoT service may be processed. In determining 1535, a FASI for the MC-IoT service may be determined. In determining 1540, an optimal flow data path for a flow over the wireless network may be determined. In generating 1545, one or more SDN flow configuration messages, corresponding respectively to one or more DGWs on the optimal flow data path, may be generated.

For some embodiments, in generating 1550, a flow response transmission for the UE carrying a flow-specific source IP address corresponding to the UE and a flow-specific destination IP address corresponding to the FASI may be generated. In some embodiments, in generating 1555, a query transmission for an SPF may be generated. In processing 1560, a response transmission from the SPF carrying a list of one or more application servers and a list of one or more respectively corresponding performance indicators may be processed. In establishing 1565, as the CASI a best application server of the one or more application servers based upon the one or more respectively corresponding performance indicators may be established.

FIG. 16 illustrates methods for a UE to support MC-IoT applications, in accordance with some embodiments of the disclosure. A method 1600 may comprise a generating 1605, a processing 1610, a generating 1615, a generating 1620, a processing 1625, and/or a generating 1630.

In generating 1605, a connection request transmission for an LNC requesting a connection with an MC-IoT service may be generated for a UE. In processing 1610, a connection response transmission from the LNC carrying a connection-specific destination IP address corresponding to a CASI for the MC-IoT service may be processed. In generating 1615, a connection-specific transmission for the CASI may be generated, the connection-specific transmission carrying the connection-specific destination IP address. In some embodiments, connection response transmission may carry a connection-specific source IP address corresponding to the UE. For some embodiments, the connection-specific transmission for the CASI may carry the connection-specific source IP address.

For some embodiments, in generating 1620, a flow request transmission for the LNC requesting a flow with the MC-IoT service may be generated. In processing 1625, a flow response transmission from the LNC carrying a flow-specific destination IP address corresponding to a FASI for the MC-IoT service may be processed. In generating 1630, a flow-specific transmission for the FASI, the flow-specific transmission carrying the flow-specific destination IP address may be generated.

In some embodiments, the flow response transmission may carry a flow-specific source IP address corresponding to the UE. For some embodiments, the flow-specific transmission for the FASI may carry the flow-specific source IP address. In some embodiments, the CASI and the FASI are different application server instances.

Figure 17:
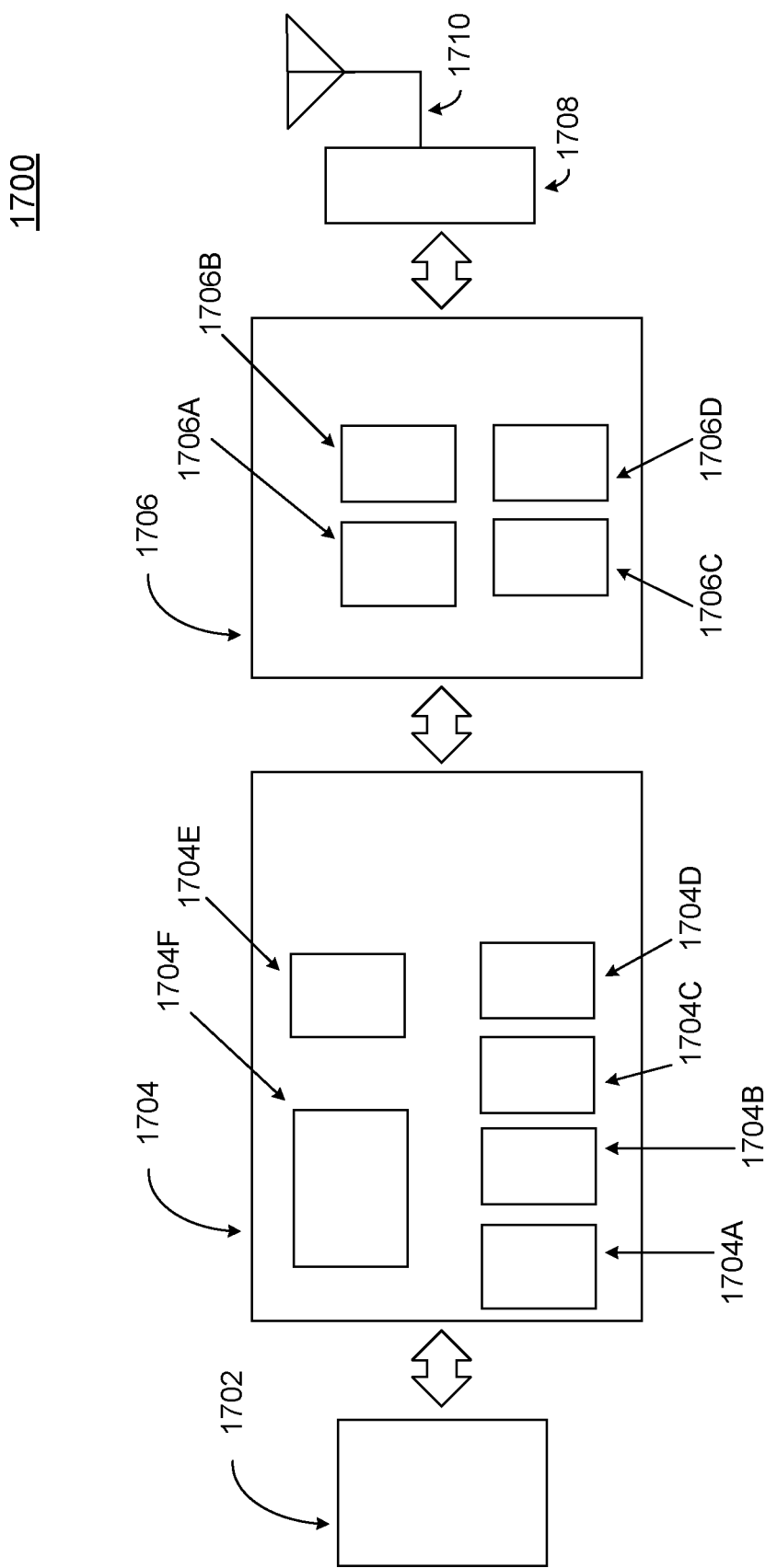
FIG. 17 illustrates example components of a UE device, in accordance with some embodiments of the disclosure.

FIG. 17 illustrates example components of a UE device, in accordance with some embodiments of the disclosure. In some embodiments, the UE device 1700 may include application circuitry 1702, baseband circuitry 1704, Radio Frequency (RF) circuitry 1706, front-end module (FEM) circuitry 1708, a low-power wake-up receiver (LP-WUR), and one or more antennas 1710, coupled together at least as shown. In some embodiments, the UE device 1700 may include additional elements such as, for example, memory/storage, display, camera, sensor, and/or input/output (I/O) interface.

The application circuitry 1702 may include one or more application processors. For example, the application circuitry 1702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1704 may include circuitry such as, but not limited to, one or more single-core or multi-core processors. The baseband circuitry 1704 may include one or more baseband processors and/or control logic to process baseband signals received from a receive signal path of the RF circuitry 1706 and to generate baseband signals for a transmit signal path of the RF circuitry 1706. Baseband processing circuitry 1704 may interface with the application circuitry 1702 for generation and processing of the baseband signals and for controlling operations of the RF circuitry 1706. For example, in some embodiments, the baseband circuitry 1704 may include a second generation (2G) baseband processor 1704A, third generation (3G) baseband processor 1704B, fourth generation (4G) baseband processor 1704C, and/or other baseband processor(s) 1704D for other existing generations, generations in development or to be developed in the future (e.g., fifth generation (5G), 6G, etc.). The baseband circuitry 1704 (e.g., one or more of baseband processors 1704A-D) may handle various radio control functions that enable communication with one or more radio networks via the RF circuitry 1706. The radio control functions may include, but are not limited to, signal modulation/demodulation, encoding/decoding, radio frequency shifting, etc. In some embodiments, modulation/demodulation circuitry of the baseband circuitry 1704 may include Fast-Fourier Transform (FFT), precoding, and/or constellation mapping/demapping functionality. In some embodiments, encoding/decoding circuitry of the baseband circuitry 1704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1704 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1704E of the baseband circuitry 1704 may be configured to run elements of the protocol stack for signaling of the PHY, MAC, RLC, PDCP and/or RRC layers. In some embodiments, the baseband circuitry may include one or more audio digital signal processor(s) (DSP) 1704F. The audio DSP(s) 1704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1704 and the application circuitry 1702 may be implemented together such as, for example, on a system on a chip (SOC).

In some embodiments, the baseband circuitry 1704 may provide for communication compatible with one or more radio technologies. For example, in some embodiments, the baseband circuitry 1704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1704 is configured to support radio communications of more than one wireless protocol may be referred to as multi-mode baseband circuitry.

RF circuitry 1706 may enable communication with wireless networks using modulated electromagnetic radiation through a non-solid medium. In various embodiments, the RF circuitry 1706 may include switches, filters, amplifiers, etc. to facilitate the communication with the wireless network. RF circuitry 1706 may include a receive signal path which may include circuitry to down-convert RF signals received from the FEM circuitry 1708 and provide baseband signals to the baseband circuitry 1704. RF circuitry 1706 may also include a transmit signal path which may include circuitry to up-convert baseband signals provided by the baseband circuitry 1704 and provide RF output signals to the FEM circuitry 1708 for transmission.

In some embodiments, the RF circuitry 1706 may include a receive signal path and a transmit signal path. The receive signal path of the RF circuitry 1706 may include mixer circuitry 1706A, amplifier circuitry 1706B and filter circuitry 1706C. The transmit signal path of the RF circuitry 1706 may include filter circuitry 1706C and mixer circuitry 1706A. RF circuitry 1706 may also include synthesizer circuitry 1706D for synthesizing a frequency for use by the mixer circuitry 1706A of the receive signal path and the transmit signal path. In some embodiments, the mixer circuitry 1706A of the receive signal path may be configured to down-convert RF signals received from the FEM circuitry 1708 based on the synthesized frequency provided by synthesizer circuitry 1706D. The amplifier circuitry 1706B may be configured to amplify the down-converted signals and the filter circuitry 1706C may be a low-pass filter (LPF) or band-pass filter (BPF) configured to remove unwanted signals from the down-converted signals to generate output baseband signals. Output baseband signals may be provided to the baseband circuitry 1704 for further processing. In some embodiments, the output baseband signals may be zero-frequency baseband signals, although this is not a requirement. In some embodiments, mixer circuitry 1706A of the receive signal path may comprise passive mixers, although the scope of the embodiments is not limited in this respect.

In some embodiments, the mixer circuitry 1706A of the transmit signal path may be configured to up-convert input baseband signals based on the synthesized frequency provided by the synthesizer circuitry 1706D to generate RF output signals for the FEM circuitry 1708. The baseband signals may be provided by the baseband circuitry 1704 and may be filtered by filter circuitry 1706C. The filter circuitry 1706C may include a low-pass filter (LPF), although the scope of the embodiments is not limited in this respect.

In some embodiments, the mixer circuitry 1706A of the receive signal path and the mixer circuitry 1706A of the transmit signal path may include two or more mixers and may be arranged for quadrature down-conversion and/or up-conversion respectively. In some embodiments, the mixer circuitry 1706A of the receive signal path and the mixer circuitry 1706A of the transmit signal path may include two or more mixers and may be arranged for image rejection (e.g., Hartley image rejection). In some embodiments, the mixer circuitry 1706A of the receive signal path and the mixer circuitry 1706A may be arranged for direct down-conversion and/or direct up-conversion, respectively. In some embodiments, the mixer circuitry 1706A of the receive signal path and the mixer circuitry 1706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1706 may include analog-to-digital converter (ADC) and digital-to-analog converter (DAC) circuitry and the baseband circuitry 1704 may include a digital baseband interface to communicate with the RF circuitry 1706.

In some dual-mode embodiments, a separate radio IC circuitry may be provided for processing signals for each spectrum, although the scope of the embodiments is not limited in this respect.

In some embodiments, the synthesizer circuitry 1706D may be a fractional-N synthesizer or a fractional N/N+1 synthesizer, although the scope of the embodiments is not limited in this respect as other types of frequency synthesizers may be suitable. For example, synthesizer circuitry 1706D may be a delta-sigma synthesizer, a frequency multiplier, or a synthesizer comprising a phase-locked loop with a frequency divider.

The synthesizer circuitry 1706D may be configured to synthesize an output frequency for use by the mixer circuitry 1706A of the RF circuitry 1706 based on a frequency input and a divider control input. In some embodiments, the synthesizer circuitry 1706D may be a fractional N/N+1 synthesizer.

In some embodiments, frequency input may be provided by a voltage controlled oscillator (VCO), although that is not a requirement. Divider control input may be provided by either the baseband circuitry 1704 or the applications processor 1702 depending on the desired output frequency. In some embodiments, a divider control input (e.g., N) may be determined from a look-up table based on a channel indicated by the applications processor 1702.

Synthesizer circuitry 1706D of the RF circuitry 1706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1706 may include an IQ/polar converter.

FEM circuitry 1708 may include a receive signal path which may include circuitry configured to operate on RF signals received from one or more antennas 1710, amplify the received signals and provide the amplified versions of the received signals to the RF circuitry 1706 for further processing. FEM circuitry 1708 may also include a transmit signal path which may include circuitry configured to amplify signals for transmission provided by the RF circuitry 1706 for transmission by one or more of the one or more antennas 1710.

In some embodiments, the FEM circuitry 1708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1706). The transmit signal path of the FEM circuitry 1708 may include a power amplifier (PA) to amplify input RF signals (e.g., provided by RF circuitry 1706), and one or more filters to generate RF signals for subsequent transmission (e.g., by one or more of the one or more antennas 1710.

In some embodiments, the UE 1700 comprises a plurality of power saving mechanisms. If the UE 1700 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1700 may transition off to an RRC_Idle state, where it disconnects from the network and does not perform operations such as channel quality feedback, handover, etc. The UE 1700 goes into a very low power state and it performs paging where again it periodically wakes up to listen to the network and then powers down again. Since the device might not receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a Logical Network Controller (LNC) operable to communicate with a User Equipment (UE) on a wireless network, comprising: one or more processors to: process a connection request transmission from the UE requesting a connection with an application service; determine a Connection-specific Application Server Instance (CASI) for the application service; and generate a connection response transmission for the UE carrying a connection-specific source IP address corresponding to the UE and a connection-specific destination IP address corresponding to the CASI.

In example 2, the apparatus of example 1, wherein the one or more processors are further to: determine an optimal connection data path for a connection over the wireless network; and generate one or more Software-Defined Networking (SDN) connection configuration messages corresponding respectively to one or more Data Gateways (DGWs) on the optimal connection data path.

In example 3, the apparatus of example 2, wherein the one or more SDN connection configuration messages configure a non-tunneling data flow through the one or more DGWs.

In example 4, the apparatus of any of examples 2 through 3, wherein the optimal connection data path is determined based on at least one of a latency requirement and a reliability requirement.

In example 5, the apparatus of any of examples 1 through 4, wherein the one or more processors are further to: process a flow request transmission from the UE requesting a flow with the application service; determine a Flow-specific Application Server Instance (FASI) for the application service; determine an optimal flow data path for a flow over the wireless network; generate one or more Software-Defined Networking (SDN) flow configuration messages corresponding respectively to one or more Data Gateways (DGWs) on the optimal flow data path; and generate a flow response transmission for the UE carrying a flow-specific source IP address corresponding to the UE and a flow-specific destination IP address corresponding to the FASI.

In example 6, the apparatus of any of examples 1 through 5, wherein the one or more processors are further to: generate a query transmission for a Service Portal Function (SPF); process a response transmission from the SPF carrying a list of one or more application servers and a list of one or more respectively corresponding performance indicators; and establish as the CASI a best application server of the one or more application servers based upon the one or more respectively corresponding performance indicators.

Example 7 provides a Logical Node Controller (LNC) device comprising an application processor, a memory, one or more antenna ports, and an interface for allowing the application processor to communicate with another device, the LNC device including the apparatus of any of examples 1 through 6.

Example 8 provides a method comprising: processing, for a Logical Network Controller (LNC), a connection request transmission from a User Equipment (UE) requesting a connection with an application service; determining a Connection-specific Application Server Instance (CASI) for the application service; and generating a connection response transmission for the UE carrying a connection-specific source IP address corresponding to the UE and a connection-specific destination IP address corresponding to the CASI.

In example 9, the method of example 8, the operation comprising: determining an optimal connection data path for a connection over the wireless network; and generating one or more Software-Defined Networking (SDN) connection configuration messages corresponding respectively to one or more Data Gateways (DGWs) on the optimal connection data path.

In example 10, the method of example 9, wherein the one or more SDN connection configuration messages configure a non-tunneling data flow through the one or more DGWs.

In example 11, the method of any of examples 9 through 10, wherein the optimal connection data path is determined based on at least one of a latency requirement and a reliability requirement.

In example 12, the method of any of examples 8 through 11, the operation comprising: processing a flow request transmission from the UE requesting a flow with the application service; determining a Flow-specific Application Server Instance (FASI) for the application service; determining an optimal flow data path for a flow over the wireless network; generating one or more Software-Defined Networking (SDN) flow configuration messages corresponding respectively to one or more Data Gateways (DGWs) on the optimal flow data path; and generating a flow response transmission for the UE carrying a flow-specific source IP address corresponding to the UE and a flow-specific destination IP address corresponding to the FASI.

In example 13, the method of any of examples 8 through 12, the operation comprising: generating a query transmission for a Service Portal Function (SPF); processing a response transmission from the SPF carrying a list of one or more application servers and a list of one or more respectively corresponding performance indicators; and establishing as the CASI a best application server of the one or more application servers based upon the one or more respectively corresponding performance indicators.

Example 14 provides machine readable storage media having machine executable instructions stored thereon that, when executed, cause one or more processors to perform a method according to any of any of examples 8 through 13.

Example 15 provides an apparatus of a Logical Network Controller (LNC) operable to communicate with a User Equipment (UE) on a wireless network, comprising: means for processing a connection request transmission from a User Equipment (UE) requesting a connection with an application service; means for determining a Connection-specific Application Server Instance (CASI) for the application service; and means for generating a connection response transmission for the UE carrying a connection-specific source IP address corresponding to the UE and a connection-specific destination IP address corresponding to the CASI.

In example 16, the apparatus of example 15, comprising: means for determining an optimal connection data path for a connection over the wireless network; and means for generating one or more Software-Defined Networking (SDN) connection configuration messages corresponding respectively to one or more Data Gateways (DGWs) on the optimal connection data path.

In example 17, the apparatus of example 16, wherein the one or more SDN connection configuration messages configure a non-tunneling data flow through the one or more DGWs.

In example 18, the apparatus of any of examples 9 through 17, wherein the optimal connection data path is determined based on at least one of a latency requirement and a reliability requirement.

In example 19, the apparatus of any of examples 15 through 18, comprising: means for processing a flow request transmission from the UE requesting a flow with the application service; means for determining a Flow-specific Application Server Instance (FASI) for the application service; means for determining an optimal flow data path for a flow over the wireless network; means for generating one or more Software-Defined Networking (SDN) flow configuration messages corresponding respectively to one or more Data Gateways (DGWs) on the optimal flow data path; and means for generating a flow response transmission for the UE carrying a flow-specific source IP address corresponding to the UE and a flow-specific destination IP address corresponding to the FASI.

In example 20, the apparatus of any of examples 15 through 19, comprising: means for generating a query transmission for a Service Portal Function (SPF); means for processing a response transmission from the SPF carrying a list of one or more application servers and a list of one or more respectively corresponding performance indicators; and means for establishing as the CASI a best application server of the one or more application servers based upon the one or more respectively corresponding performance indicators.

Example 21 provides machine readable storage media having machine executable instructions that, when executed, cause one or more processors to perform an operation comprising: process, for a Logical Network Controller (LNC), a connection request transmission from a User Equipment (UE) requesting a connection with an application service; determine a Connection-specific Application Server Instance (CASI) for the application service; and generate a connection response transmission for the UE carrying a connection-specific source IP address corresponding to the UE and a connection-specific destination IP address corresponding to the CASI.

In example 22, the machine readable storage media of example 21, the operation comprising: determine an optimal connection data path for a connection over the wireless network; and generate one or more Software-Defined Networking (SDN) connection configuration messages corresponding respectively to one or more Data Gateways (DGWs) on the optimal connection data path.

In example 23, the machine readable storage media of example 22, wherein the one or more SDN connection configuration messages configure a non-tunneling data flow through the one or more DGWs.

In example 24, the machine readable storage media of any of examples 22 through 23, wherein the optimal connection data path is determined based on at least one of a latency requirement and a reliability requirement.

In example 25, the machine readable storage media of any of examples 21 through 24, the operation comprising: process a flow request transmission from the UE requesting a flow with the application service; determine a Flow-specific Application Server Instance (FASI) for the application service; determine an optimal flow data path for a flow over the wireless network; generate one or more Software-Defined Networking (SDN) flow configuration messages corresponding respectively to one or more Data Gateways (DGWs) on the optimal flow data path; and generate a flow response transmission for the UE carrying a flow-specific source IP address corresponding to the UE and a flow-specific destination IP address corresponding to the FASI.

In example 26, the machine readable storage media of any of examples 21 through 25, the operation comprising: generate a query transmission for a Service Portal Function (SPF); process a response transmission from the SPF carrying a list of one or more application servers and a list of one or more respectively corresponding performance indicators; and establish as the CASI a best application server of the one or more application servers based upon the one or more respectively corresponding performance indicators.

Example 27 provides an apparatus of a User Equipment (UE) operable to communicate with a Logical Network Controller (LNC) on a wireless network, comprising: one or more processors to: generate a connection request transmission for the LNC requesting a connection with an application service; process a connection response transmission from the LNC carrying a connection-specific destination IP address corresponding to a Connection-specific Application Server Instance (CASI) for the application service; and generate a connection-specific transmission for the CASI, the connection-specific transmission carrying the connection-specific destination IP address.

In example 28, the apparatus of example 27, wherein the connection response transmission carries a connection-specific source IP address corresponding to the UE; and wherein the connection-specific transmission for the CASI carries the connection-specific source IP address.

In example 29, the apparatus of either of examples 27 or 28, wherein the one or more processors are further to: generate a flow request transmission for the LNC requesting a flow with the application service; process a flow response transmission from the LNC carrying a flow-specific destination IP address corresponding to a Flow-specific Application Server Instance (FASI) for the application service; and generate a flow-specific transmission for the FASI, the flow-specific transmission carrying the flow-specific destination IP address.

In example 30, the apparatus of any of examples 27 through 29, wherein the flow response transmission carries a flow-specific source IP address corresponding to the UE; and wherein the flow-specific transmission for the FASI carries the flow-specific source IP address.

In example 31, the apparatus of any of examples 27 through 30, wherein the CASI and the FASI are different application server instances.

Example 32 provides a User Equipment (UE) device comprising an application processor, a memory, one or more antennas, a wireless interface for allowing the application processor to communicate with another device, and a touch-screen display, the UE device including the apparatus of any of examples 27 through 31.

Example 33 provides a method comprising: generating, for a User Equipment (UE), a connection request transmission for a Logical Network Controller (LNC) requesting a connection with an application service; processing a connection response transmission from the LNC carrying a connection-specific destination IP address corresponding to a Connection-specific Application Server Instance (CASI) for the application service; and generating a connection-specific transmission for the CASI, the connection-specific transmission carrying the connection-specific destination IP address.

In example 34, the method of example 33, wherein the connection response transmission carries a connection-specific source IP address corresponding to the UE; and wherein the connection-specific transmission for the CASI carries the connection-specific source IP address.

In example 35, the method of either of examples 33 or 34, the operation comprising: generating a flow request transmission for the LNC requesting a flow with the application service; processing a flow response transmission from the LNC carrying a flow-specific destination IP address corresponding to a Flow-specific Application Server Instance (FASI) for the application service; and generating a flow-specific transmission for the FASI, the flow-specific transmission carrying the flow-specific destination IP address.

In example 36, the method of example 35, wherein the flow response transmission carries a flow-specific source IP address corresponding to the UE; and wherein the flow-specific transmission for the FASI carries the flow-specific source IP address.

In example 37, the method of either of examples 35 or 36, wherein the CASI and the FASI are different application server instances.

Example 38 provides machine readable storage media having machine executable instructions stored thereon that, when executed, cause one or more processors to perform a method according to any of examples 33 through 37.

Example 39 provides an apparatus of a User Equipment (UE) operable to communicate with a Logical Network Controller (LNC) on a wireless network, comprising: means for generating a connection request transmission for a Logical Network Controller (LNC) requesting a connection with an application service; means for processing a connection response transmission from the LNC carrying a connection-specific destination IP address corresponding to a Connection-specific Application Server Instance (CASI) for the application service; and means for generating a connection-specific transmission for the CASI, the connection-specific transmission carrying the connection-specific destination IP address.

In example 40, the apparatus of example 39, wherein the connection response transmission carries a connection-specific source IP address corresponding to the UE; and wherein the connection-specific transmission for the CASI carries the connection-specific source IP address.

In example 41, the apparatus of either of examples 39 or 40, comprising: means for generating a flow request transmission for the LNC requesting a flow with the application service; means for processing a flow response transmission from the LNC carrying a flow-specific destination IP address corresponding to a Flow-specific Application Server Instance (FASI) for the application service; and means for generating a flow-specific transmission for the FASI, the flow-specific transmission carrying the flow-specific destination IP address.

In example 42, the apparatus of example 41, wherein the flow response transmission carries a flow-specific source IP address corresponding to the UE; and wherein the flow-specific transmission for the FASI carries the flow-specific source IP address.

In example 43, the apparatus of either of examples 41 or 42, wherein the CASI and the FASI are different application server instances.

Example 44 provides machine readable storage media having machine executable instructions that, when executed, cause one or more processors to perform an operation comprising: generate, for a User Equipment (UE), a connection request transmission for a Logical Network Controller (LNC) requesting a connection with an application service; process a connection response transmission from the LNC carrying a connection-specific destination IP address corresponding to a Connection-specific Application Server Instance (CASI) for the application service; and generate a connection-specific transmission for the CASI, the connection-specific transmission carrying the connection-specific destination IP address.

In example 45, the machine readable storage media of example 44, wherein the connection response transmission carries a connection-specific source IP address corresponding to the UE; and wherein the connection-specific transmission for the CASI carries the connection-specific source IP address.

In example 46, the machine readable storage media of either of examples 44 or 45, the operation comprising: generate a flow request transmission for the LNC requesting a flow with the application service; process a flow response transmission from the LNC carrying a flow-specific destination IP address corresponding to a Flow-specific Application Server Instance (FASI) for the application service; and generate a flow-specific transmission for the FASI, the flow-specific transmission carrying the flow-specific destination IP address.

In example 47, the machine readable storage media of example 46, wherein the flow response transmission carries a flow-specific source IP address corresponding to the UE; and wherein the flow-specific transmission for the FASI carries the flow-specific source IP address.

In example 48, the machine readable storage media of either of examples 46 or 47, wherein the CASI and the FASI are different application server instances.

In example 49, the apparatus of any of examples 1 through 6, 15 through 20, 27 through 31, and 39 through 43, wherein the one or more processors comprise a baseband processor.

In example 50, the apparatus of any of examples 1 through 6, 15 through 20, 27 through 31, and 39 through 43, wherein the one or more processors comprise a transceiver circuitry for at least one of: generating transmissions, encoding transmissions, processing transmissions, or decoding transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A Logical Network Controller (LNC) operable to communicate with a User Equipment (UE) on a wireless network, comprising:
   one or more processors to:
      process a connection request transmission from the UE requesting a connection with an application service;
      determine a Connection-specific Application Server Instance (CAST) for the application service, wherein the CASI is coupled to the UE by a connection-specific data path established for ongoing connectivity between the UE and the CASI, and wherein the CASI is configured to communicate application signaling to add or remove flows between the UE and the application service;
      generate a connection response transmission for the UE carrying a connection-specific source IP address corresponding to the UE and a connection-specific destination IP address corresponding to the CASI based on the connection-specific data path;

process a flow request transmission from the UE requesting a flow with the application service;

determine a Flow-specific Application Server Instance (FAST) for the application service coupled to the UE by a flow-specific data path that is established after the connection-specific data path between the UE and the CASI has been established, wherein the FASI is configured to provide a flow added by the CASI; and generate a flow response transmission for the UE carrying a flow-specific source IP address corresponding to the UE and a flow-specific destination IP address corresponding to the FASI.

2. The LNC of claim 1, wherein the one or more processors are further to:

determine an optimal connection data path for a connection over the wireless network; and generate one or more Software-Defined Networking (SDN) connection configuration messages corresponding respectively to one or more Data Gateways (DGWs) on the optimal connection data path.

3. The LNC of claim 2, wherein the one or more SDN connection configuration messages configure a non-tunneling data flow through the one or more DGWs.

4. The LNC of claim 2, wherein the optimal connection data path is determined based on at least one of a latency requirement and a reliability requirement.

5. The LNC of claim 1, wherein the one or more processors are further to:

determine an optimal flow data path for a flow over the wireless network; and generate one or more Software-Defined Networking (SDN) flow configuration messages corresponding respectively to one or more Data Gateways (DGWs) on the optimal flow data path.

6. The LNC of claim 1, wherein the one or more processors are further to:

generate a query transmission for a Service Portal Function (SPF);

process a response transmission from the SPF carrying a list of one or more application servers and a list of one or more respectively corresponding performance indicators; and establish as the CASI a best application server of the one or more application servers based upon the one or more respectively corresponding performance indicators.

7. One or more non-transitory, computer-readable media having machine executable instructions that, when executed, cause one or more processors to perform an operation comprising:

processing, for a Logical Network Controller (LNC), a connection request transmission from a User Equipment (UE) requesting a connection with an application service;

determining a Connection-specific Application Server Instance (CAST) for the application service, wherein the CASI is coupled to the UE by a connection-specific data path established for ongoing connectivity between the UE and the CASI, and wherein the CASI is configured to communicate application signaling to add or remove flows between the UE and the application service; and generating a connection response transmission for the UE carrying a connection-specific source IP address corresponding to the UE and a connection-specific destination IP address corresponding to the CASI based on the connection-specific data path;

processing a flow request transmission from the UE requesting a flow with the application service;

determining a Flow-specific Application Server Instance (FAST) for the application service coupled to the UE by a flow-specific data path that is established after the connection-specific data path between the UE and the CASI has been established, wherein the FASI is configured to provide a flow added by the CASI; and generating a flow response transmission for the UE carrying a flow-specific source IP address corresponding to the UE and a flow-specific destination IP address corresponding to the FASI.

8. The one or more non-transitory, computer-readable media of claim 7, the operation further comprising:

determining an optimal connection data path for a connection over a wireless network; and generating one or more Software-Defined Networking (SDN) connection configuration messages corresponding respectively to one or more Data Gateways (DGWs) on the optimal connection data path.

9. The one or more non-transitory, computer-readable media of claim 8, wherein the one or more SDN connection configuration messages configure a non-tunneling data flow through the one or more DGWs.

10. The one or more non-transitory, computer-readable media of claim 8, wherein the optimal connection data path is determined based on at least one of a latency requirement and a reliability requirement.

11. The one or more non-transitory, computer-readable media of claim 7, the operation further comprising:

determining an optimal flow data path for a flow over a wireless network; and generating one or more Software-Defined Networking (SDN) flow configuration messages corresponding respectively to one or more Data Gateways (DGWs) on the optimal flow data path.

12. The one or more non-transitory, computer-readable media of claim 7, the operation further comprising:

generating a query transmission for a Service Portal Function (SPF);

processing a response transmission from the SPF carrying a list of one or more application servers and a list of one or more respectively corresponding performance indicators; and establishing as the CASI a best application server of the one or more application servers based upon the one or more respectively corresponding performance indicators.

13. A User Equipment (UE) comprising:

a memory;

one or more processors coupled to the memory and, when executing instructions stored in the memory, configured to perform:

generating a connection request transmission for a Logical Network Controller (LNC) requesting a connection with an application service;

processing a connection response transmission from the LNC carrying a connection-specific destination IP address corresponding to a Connection-specific Application Server Instance (CASI) for the application service, wherein the CASI is coupled to the UE by a connection-specific data path established for ongoing connectivity between the UE and the CASI, and wherein the CASI is configured to communicate application signaling to add or remove flows between the UE and the application service;

generating a connection-specific transmission for the CASI, the connection-specific transmission carrying the connection-specific destination IP address based on the connection-specific data path;

generating a flow request transmission for the LNC requesting a flow with the application service;

processing a flow response transmission from the LNC carrying a flow-specific destination IP address corresponding to a Flow-specific Application Server Instance (FAST) for the application service coupled to the UE by a flow-specific data path that is established after the connection-specific data path between the UE and the CASI has been established, wherein the FASI is configured to provide a flow added by the CASI; and generating a flow-specific transmission for the FASI, the flow-specific transmission carrying the flow-specific destination IP address;

wherein the CASI and the FASI are different application server instances.

14. The UE of claim 13, wherein the connection response transmission carries a connection-specific source IP address corresponding to the UE; and wherein the connection-specific transmission for the CASI carries the connection-specific source IP address.

15. The UE of claim 13, wherein the flow response transmission carries a flow-specific source IP address corresponding to the UE; and wherein the flow-specific transmission for the FASI carries the flow-specific source IP address.

16. One or more non-transitory, computer-readable media having machine executable instructions that, when executed, cause one or more processors to perform an operation comprising:

generating, for a User Equipment (UE), a connection request transmission for a Logical Network Controller (LNC) requesting a connection with an application service;

processing a connection response transmission from the LNC carrying a connection-specific destination IP address corresponding to a Connection-specific Application Server Instance (CAST) for the application service, wherein the CASI is coupled to the UE by a connection-specific data path established for ongoing connectivity between the UE and the CASI, and wherein the CASI is configured to communicate application signaling to add or remove flows between the UE and the application service; and generating a connection-specific transmission for the CASI, the connection-specific transmission carrying the connection-specific destination IP address based on the connection-specific data path;

generating a flow request transmission for the LNC requesting a flow with the application service;

processing a flow response transmission from the LNC carrying a flow-specific destination IP address corresponding to a Flow-specific Application Server Instance (FAST) for the application service coupled to the UE by a flow-specific data path that is established after the connection-specific data path between the UE and the CASI has been established, wherein the FASI is configured to provide a flow added by the CASI; and generating a flow-specific transmission for the FASI, the flow-specific transmission carrying the flow-specific destination IP address;

wherein the CASI and the FASI are different application server instances.

17. The one or more non-transitory, computer-readable media of claim 16, wherein the connection response transmission carries a connection-specific source IP address corresponding to the UE; and wherein the connection-specific transmission for the CASI carries the connection-specific source IP address.

18. The one or more non-transitory, computer-readable media of claim 16, wherein the flow response transmission carries a flow-specific source IP address corresponding to the UE; and wherein the flow-specific transmission for the FASI carries the flow-specific source IP address.

* * * * *